(12) United States Patent
Leahy

(10) Patent No.: US 10,787,803 B2
(45) Date of Patent: Sep. 29, 2020

(54) METHODS AND SYSTEMS FOR MODULAR BUILDINGS

(71) Applicant: Charles H. Leahy, Asheville, NC (US)

(72) Inventor: Charles H. Leahy, Asheville, NC (US)

( * ) Notice: Subject to any disclaimer, the term of this patent is extended or adjusted under 35 U.S.C. 154(b) by 149 days.

(21) Appl. No.: 15/592,388

(22) Filed: May 11, 2017

(65) Prior Publication Data
US 2017/0306610 A1 Oct. 26, 2017

Related U.S. Application Data

(63) Continuation-in-part of application No. 12/322,380, filed on Feb. 2, 2009, now abandoned.

(60) Provisional application No. 61/063,191, filed on Feb. 2, 2008.

(51) Int. Cl.
| | |
|---|---|
| *E04C 2/52* | (2006.01) |
| *E04B 1/74* | (2006.01) |
| *E04B 1/343* | (2006.01) |
| *E04B 1/61* | (2006.01) |

(52) U.S. Cl.
CPC ............ *E04B 1/34321* (2013.01); *E04B 1/61* (2013.01); *E04B 1/74* (2013.01); *E04C 2/521* (2013.01); *E04C 2/526* (2013.01); *E04B 1/6183* (2013.01); *E04B 2001/34389* (2013.01); *Y02A 30/261* (2018.01); *Y02B 30/94* (2013.01)

(58) Field of Classification Search
CPC ..... E04C 1/39; E04C 2/10; E04C 2/20; E04C 2/44; E04C 2/45; E04C 2/52; E04C 2/5821; E04C 2/526; E04B 1/343; E04B 1/34321; E04B 1/74; E04B 1/741; E04B 1/61; E04B 1/6183; E04B 2001/34389; E04B 2/00; E04B 2/84; E04B 2/74; E04B 2/76
USPC ....... 52/794.1, 784.14, 784.15, 220.1, 220.2, 52/220.7, 220.8, 309.1, 309.4, 309.15, 52/309.16, 309.7, 782.1
See application file for complete search history.

(56) References Cited

U.S. PATENT DOCUMENTS

| | | | |
|---|---|---|---|
| 4,575,981 A | 3/1986 | Porter | |
| 4,748,780 A | 6/1988 | Vinther | |
| 5,424,118 A | 6/1995 | McLaughlin | |
| 5,428,388 A * | 6/1995 | von Bauer | H04N 7/186 348/155 |
| 5,497,589 A | 3/1996 | Porter | |
| 5,755,068 A | 5/1998 | Ormiston | |
| 5,771,645 A * | 6/1998 | Porter | E04C 2/243 29/897 |
| 5,950,389 A | 9/1999 | Porter | |
| 6,029,416 A | 2/2000 | Andersson | |
| 6,240,704 B1 | 6/2001 | Porter | |
| 6,599,621 B2 | 7/2003 | Porter | |
| 7,090,509 B1 * | 8/2006 | Gilliland | G02B 6/4246 385/92 |
| 7,493,731 B2 | 2/2009 | Zhang | |
| 7,542,295 B2 * | 6/2009 | Imsand | G06F 1/181 361/724 |
| 7,892,631 B2 | 2/2011 | Bauer | |
| 8,539,732 B2 | 9/2013 | Leahy | |
| 8,590,264 B2 | 11/2013 | Leahy | |
| 9,179,109 B1 * | 11/2015 | Kasmir | G08B 3/10 |

(Continued)

Primary Examiner — Jessica L Laux
(74) Attorney, Agent, or Firm — NEO IP

(57) ABSTRACT

Pre-fabricated wall panels with embedded electronic devices. Also, a modular building made from pre-fabricated panels with embedded electronic devices, individual panel identifiers, and a central computer system.

20 Claims, 43 Drawing Sheets

(56) References Cited

U.S. PATENT DOCUMENTS

| | | | | |
|---|---|---|---|---|
| 9,441,363 | B2* | 9/2016 | Lewin | E04B 1/86 |
| 10,116,102 | B2* | 10/2018 | Randall | H02G 3/12 |
| 10,175,996 | B2* | 1/2019 | Byrne | G04G 9/02 |
| 10,418,813 | B1* | 9/2019 | King | H01R 24/68 |
| 2003/0079438 | A1* | 5/2003 | Stephens | B28B 23/0056 |
| | | | | 52/782.1 |
| 2008/0313973 | A1* | 12/2008 | Butler Rolf | E04H 3/08 |
| | | | | 52/79.1 |
| 2009/0180261 | A1* | 7/2009 | Angelides | H01H 83/04 |
| | | | | 361/747 |
| 2011/0194858 | A1* | 8/2011 | Rotenstein | H04B 10/801 |
| | | | | 398/135 |
| 2014/0335803 | A1* | 11/2014 | Rivera | H04B 1/38 |
| | | | | 455/90.3 |
| 2016/0219728 | A1* | 7/2016 | Balyan | H02B 1/00 |
| 2016/0286678 | A1* | 9/2016 | Venugopal | G06F 13/4068 |
| 2017/0214224 | A1* | 7/2017 | Wickett | H05K 7/1492 |

* cited by examiner

Examples of magnets or electro-magnets to bind wall or roof or floor panel to another wall or roof or floor panel or to other structural member

PRIOR ART FIG. 13

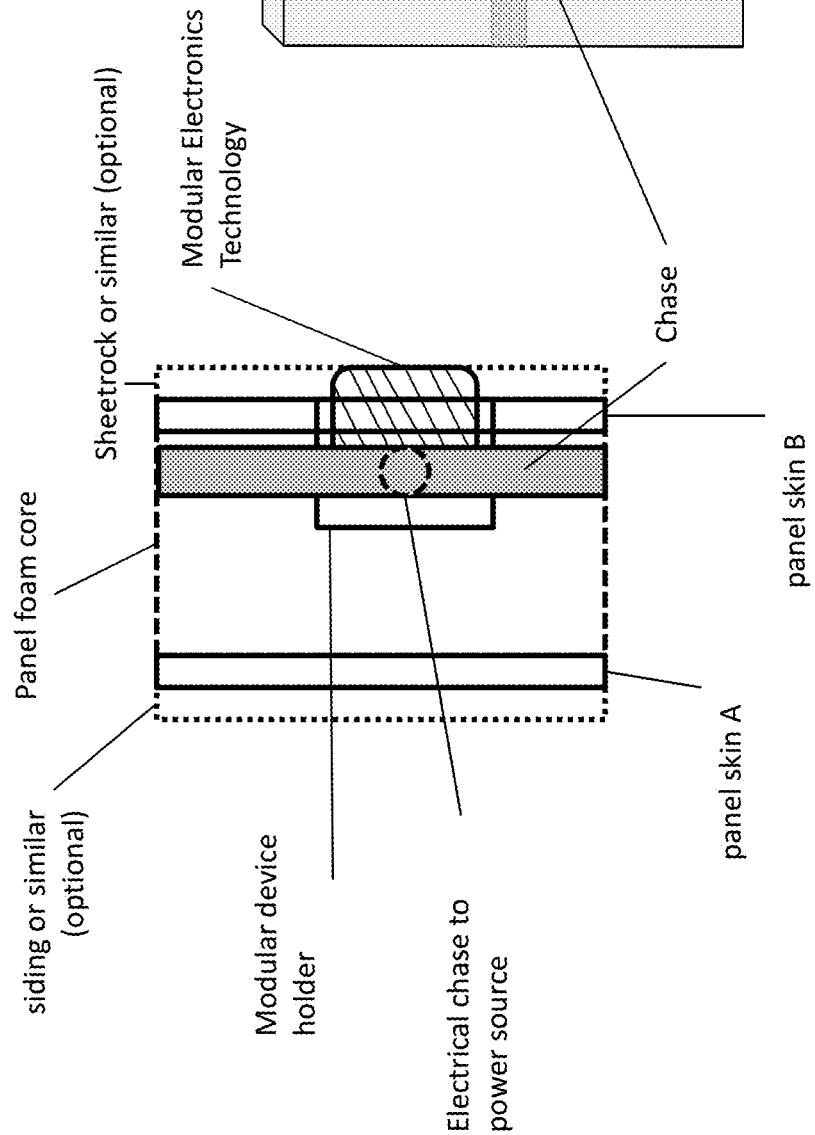

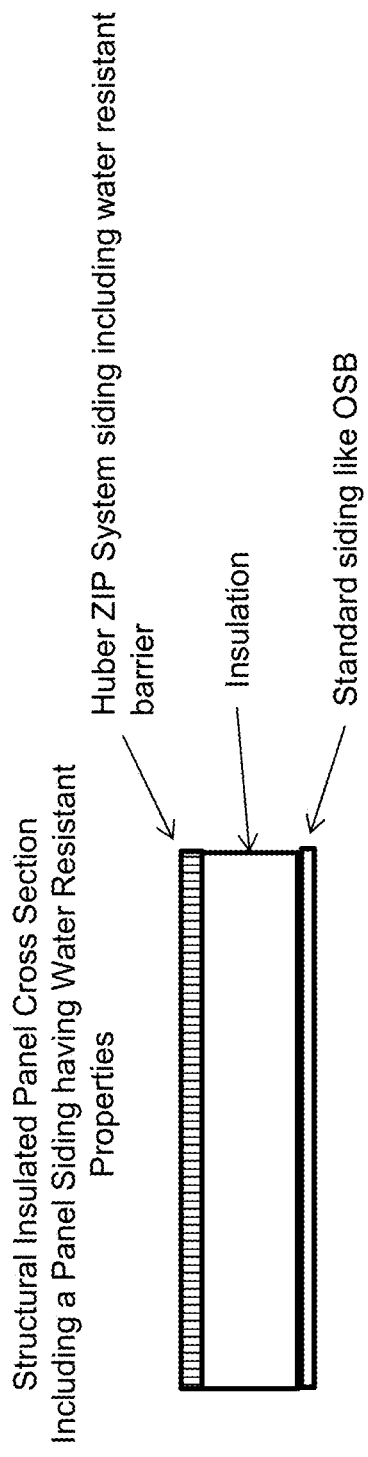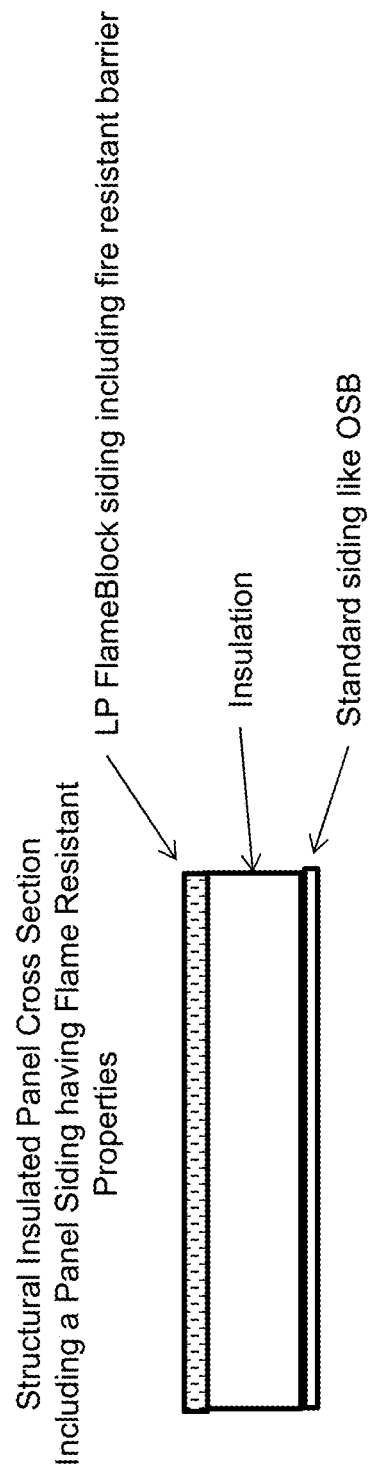
FIG. 24
Structural Insulated Panel Cross Section Including a Panel Siding having Water Resistant Properties
FIG. 25
Structural Insulated Panel Cross Section Including a Panel Siding having Flame Resistant Properties

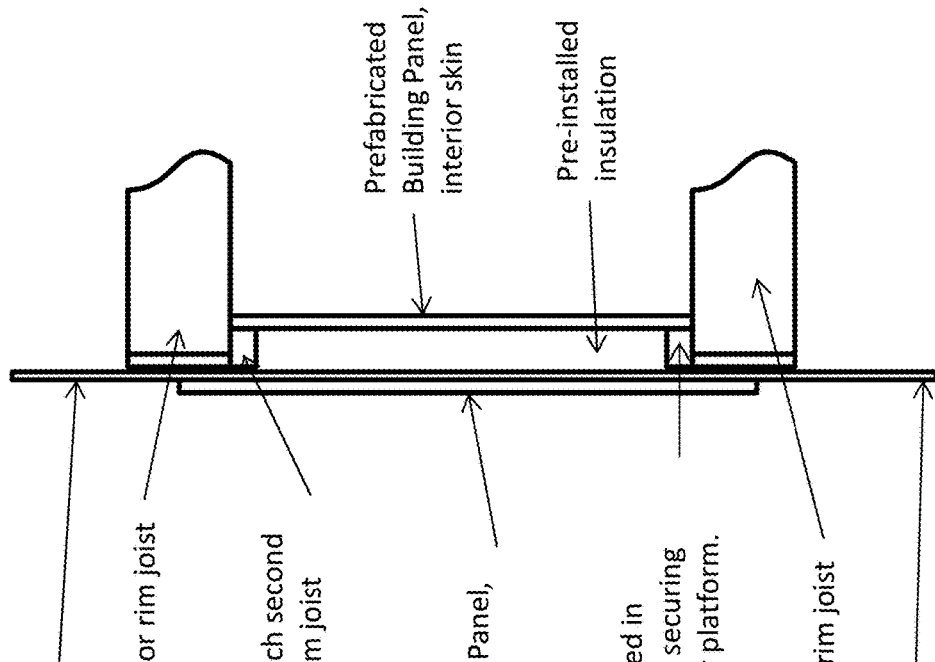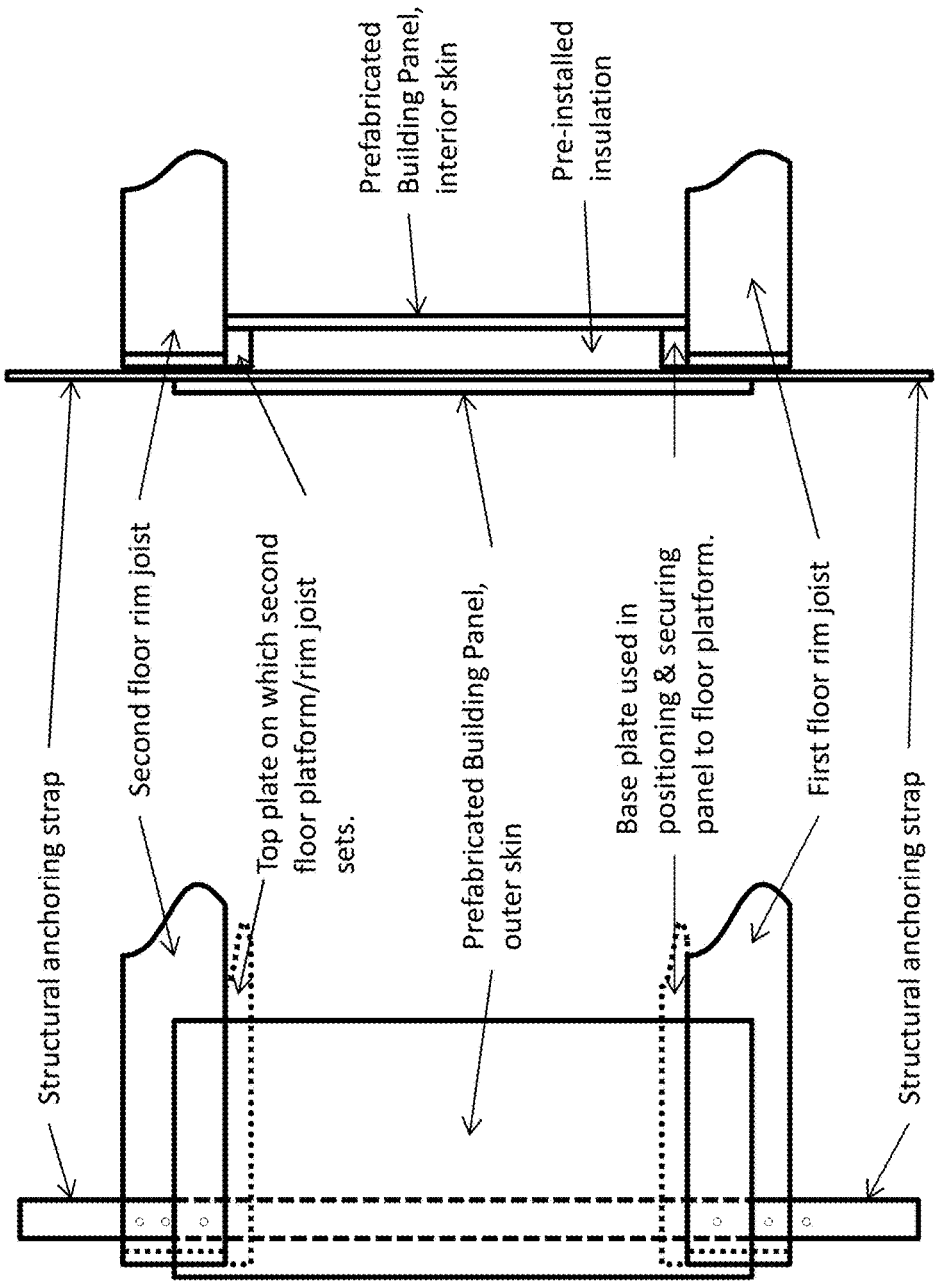
Placement of Structural Anchoring Strap in Prefabricated Insulated Panel
FIG. 26A – EXTERIOR VIEW
FIG. 26B SIDE VIEW

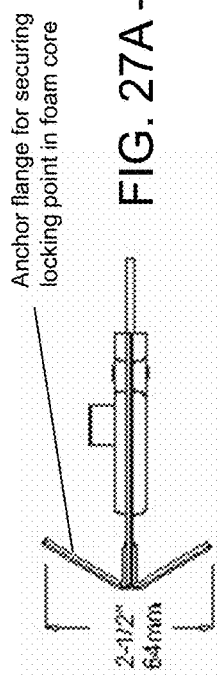
FIG. 27A – PRIOR ART Locking point
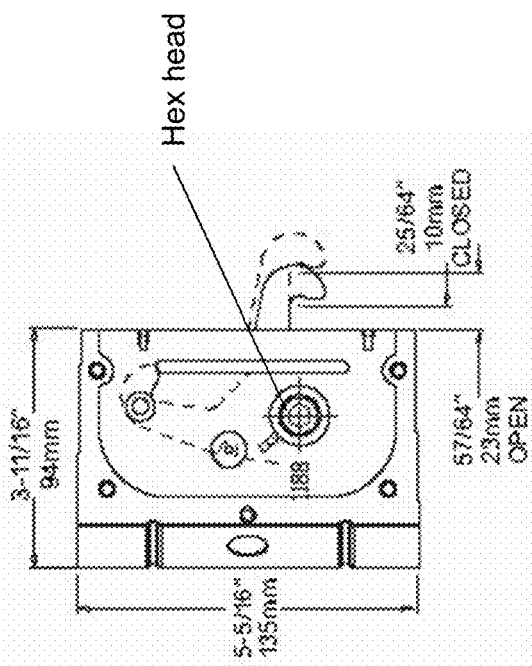
FIG. 27B – PRIOR ART Locking point
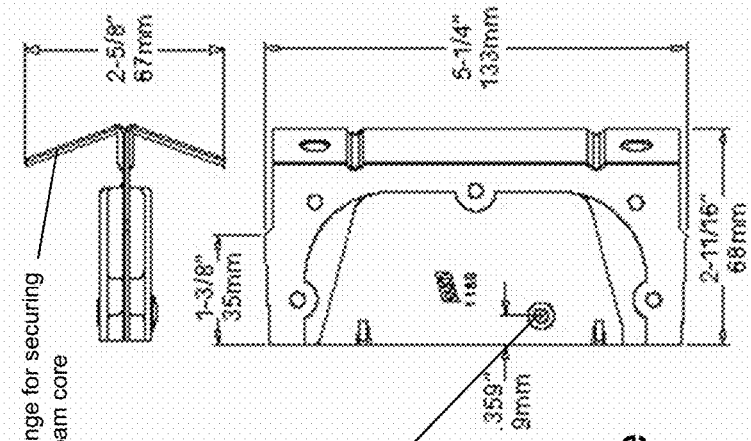
FIG. 27C – PRIOR ART Strike
FIG. 27D – PRIOR ART Strike

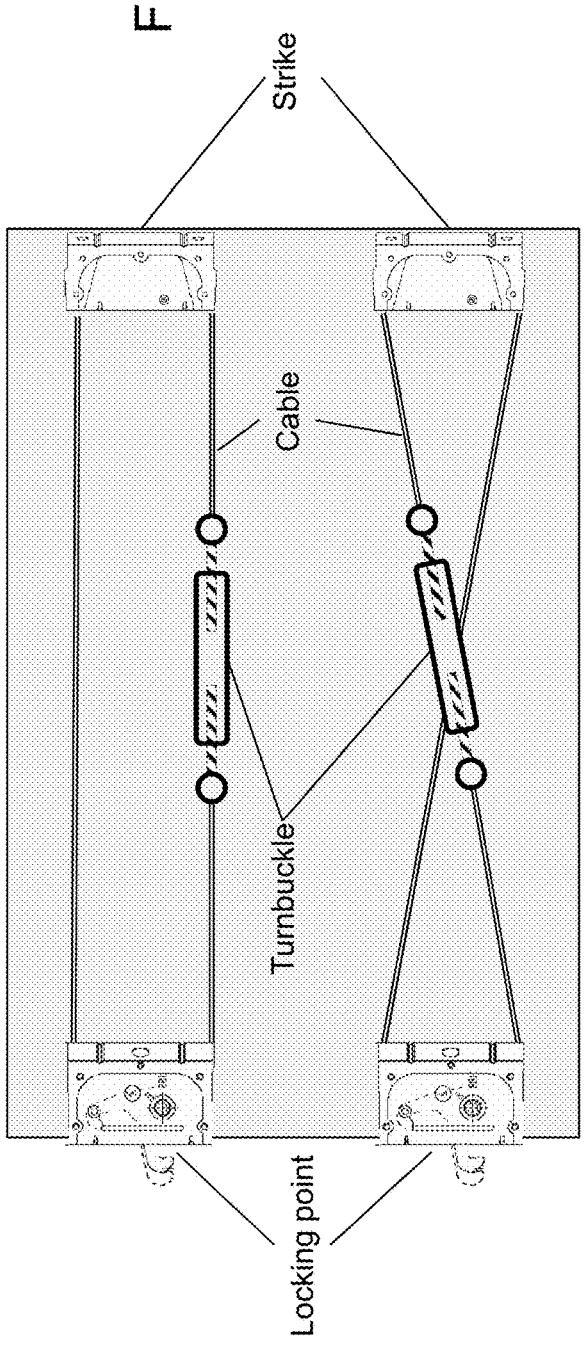
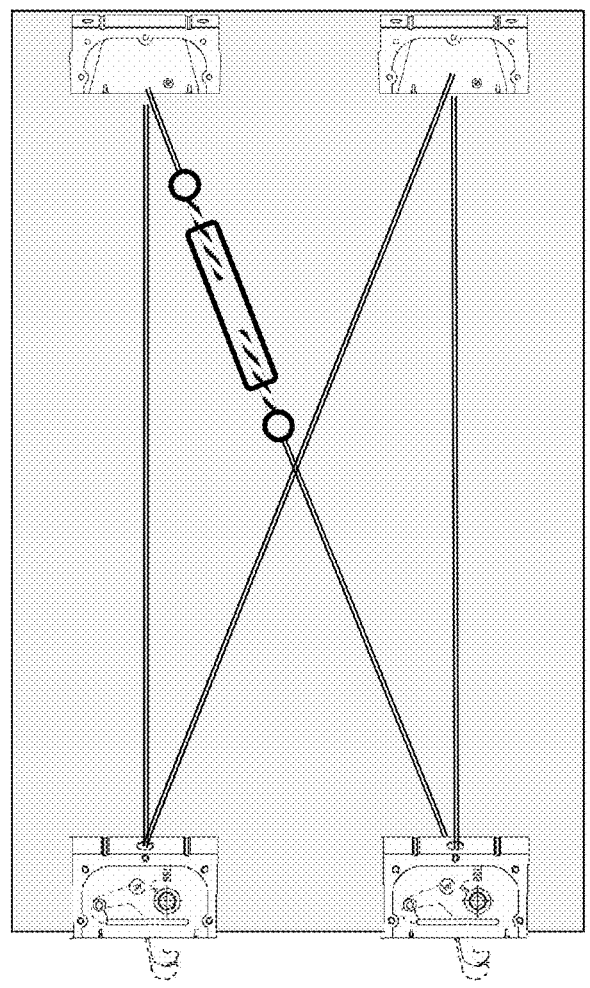
FIG. 29A
FIG. 29B

Cam-lock wrench access shaft insert

End view

Side view

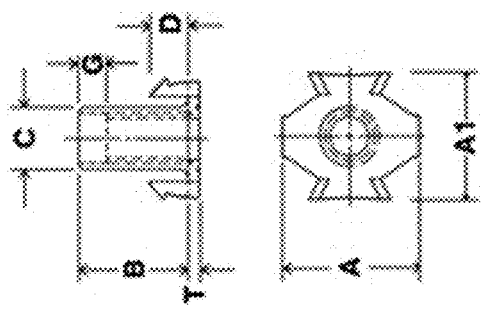
PRIOR ART
Rivet T-nut
FIG. 34A
FIG. 34B
FIG. 34C
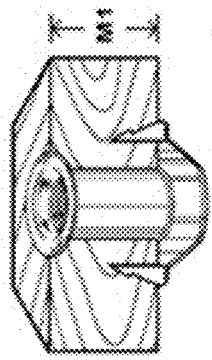
T-nut
FIG. 33
PRIOR ART

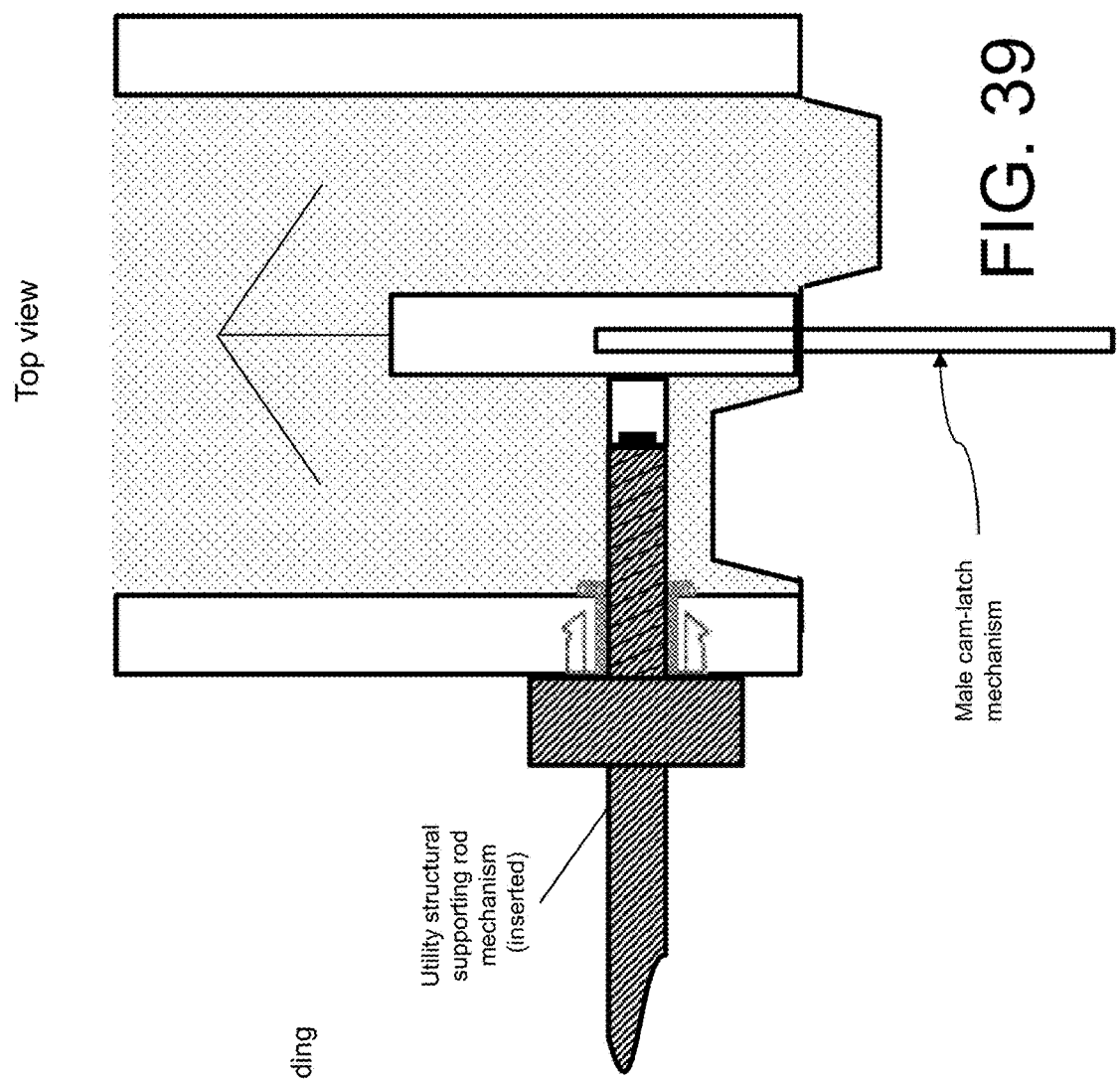
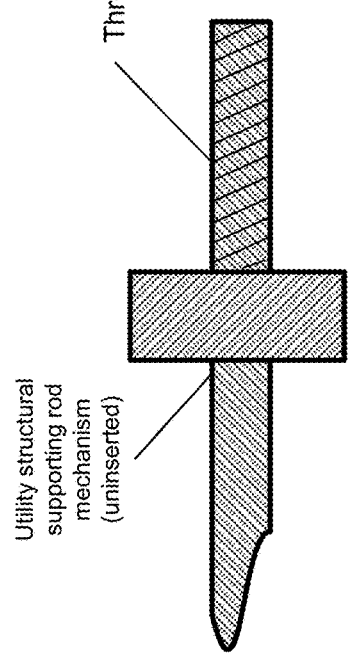

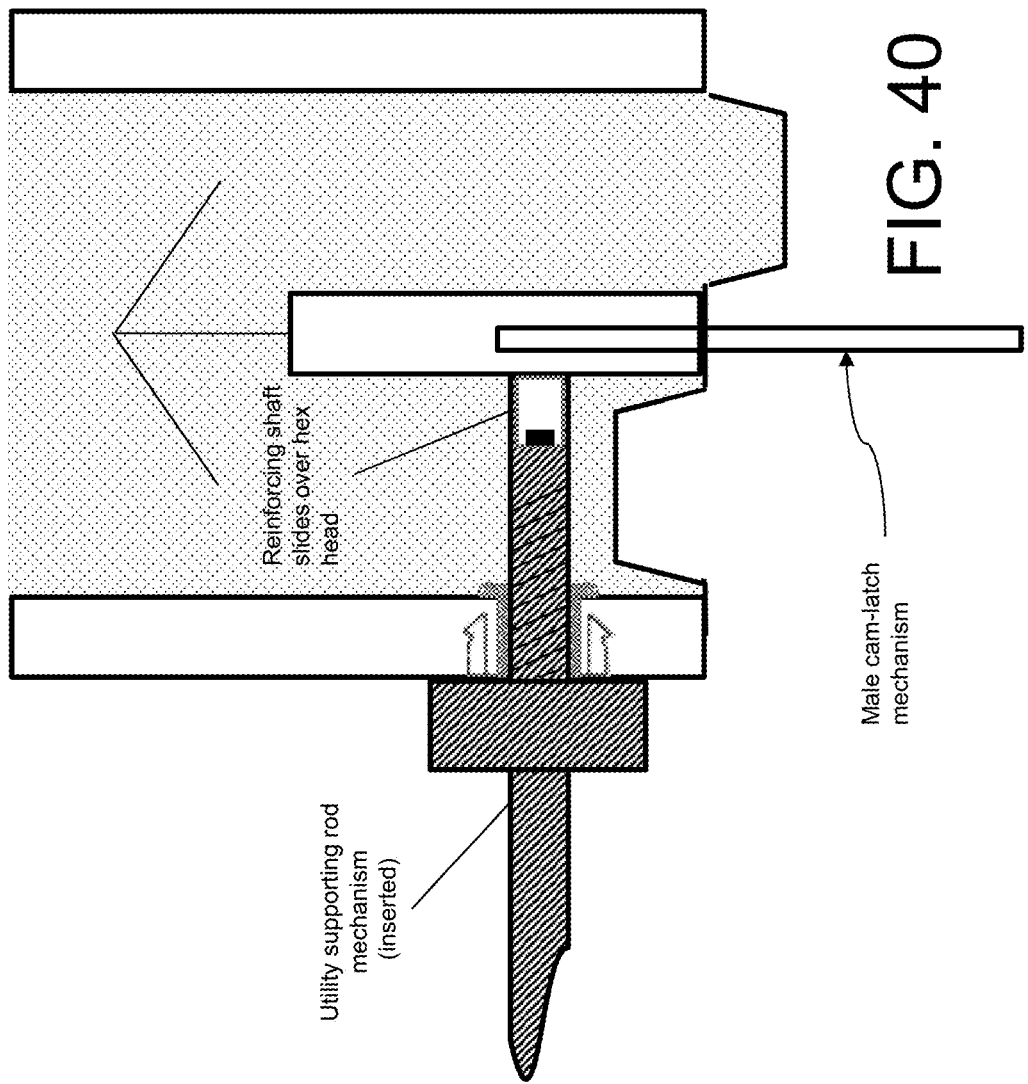

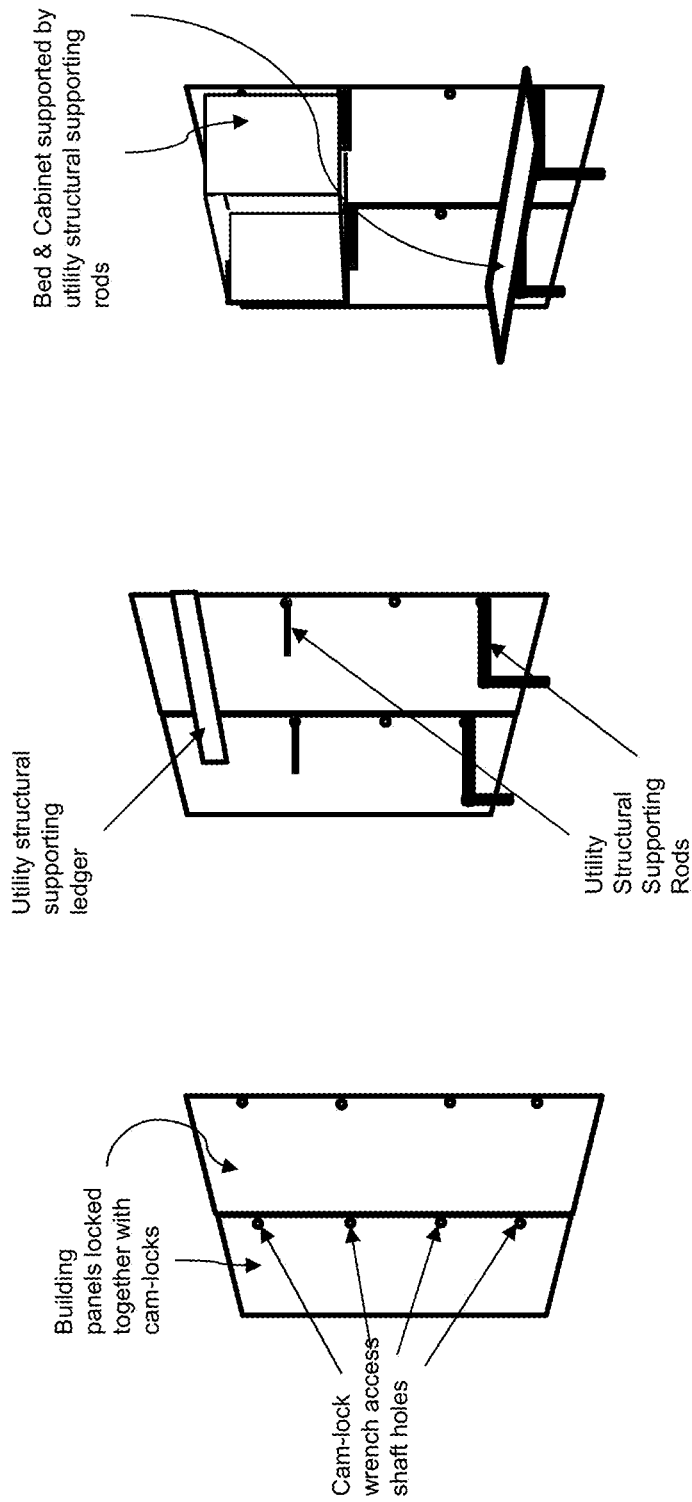

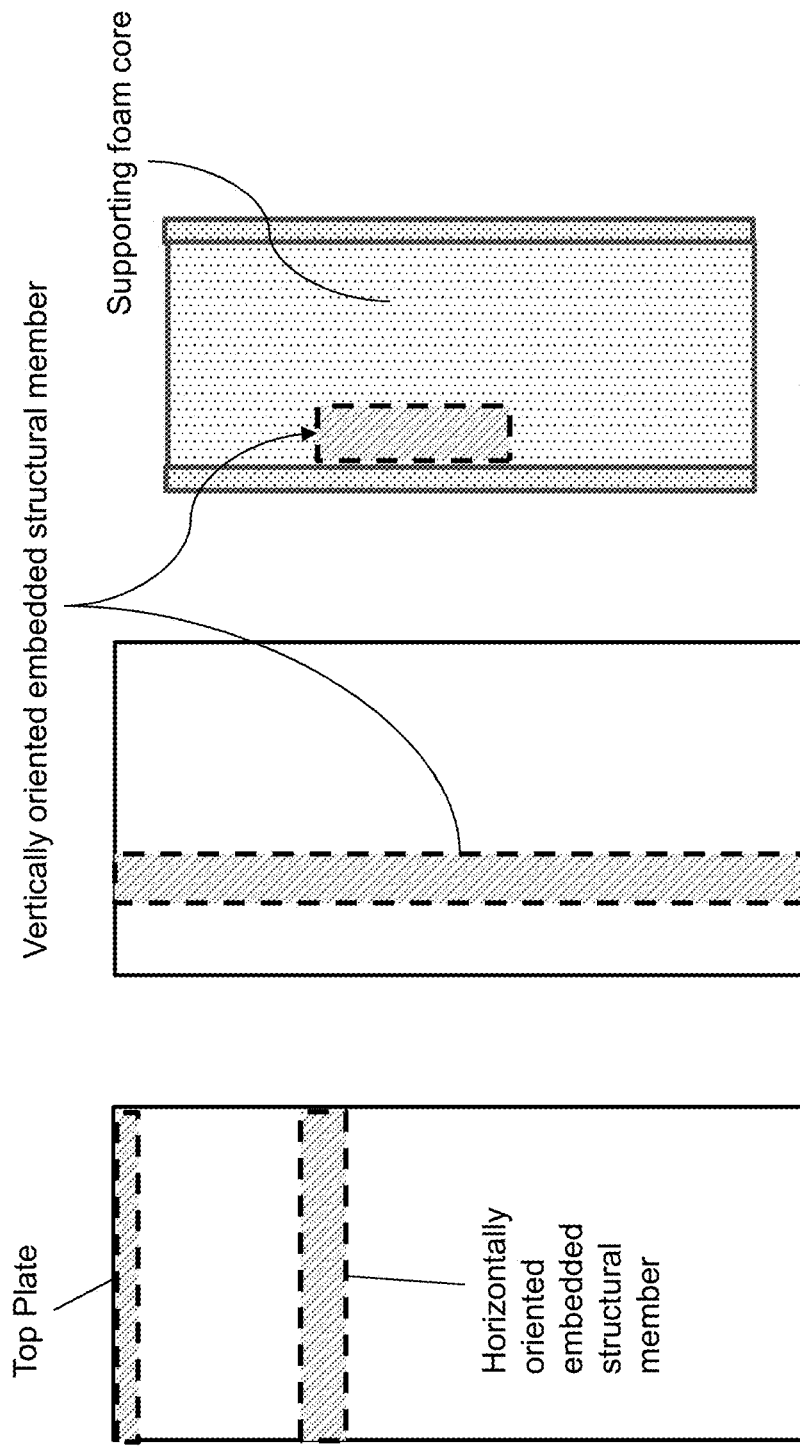

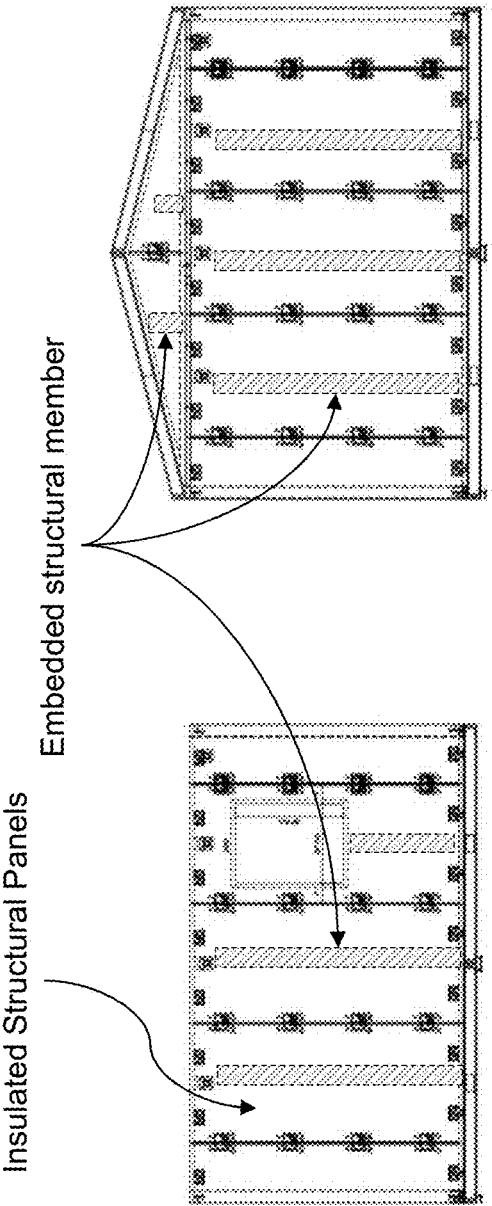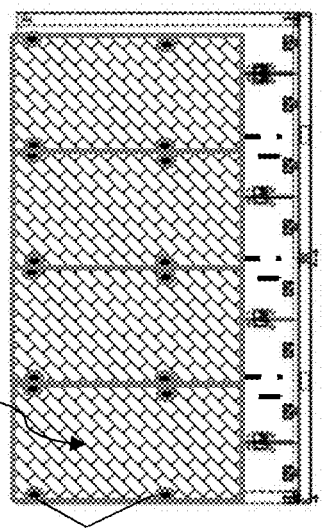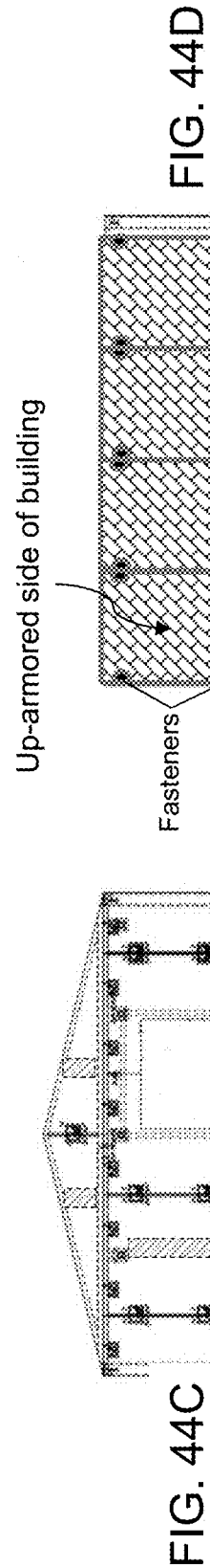

METHODS AND SYSTEMS FOR MODULAR BUILDINGS

CROSS REFERENCE TO RELATED APPLICATIONS

This application is a continuation of U.S. patent application Ser. No. 12/322,380, filed Feb. 2, 2009, which claims the benefit of U.S. Provisional Application No. 61/063,191 filed Feb. 2, 2008, both of which are incorporated herein by reference in their entirety.

BACKGROUND OF THE INVENTION

1. Field of the Invention

The present invention relates generally to modular building systems and methods, and more particularly, to modular building panels with embedded electronic devices.

2. Description of the Prior Art

Modular buildings and components used in making them are known in the art. By way of example, prefabricated housing components, including wall, floor and roof panels are known. However, energy losses most commonly occur in the seams, framing or joint regions of structures, including prefabricated buildings and modular structural components. Additionally, while prefabricated panels and other components are known in the art, they are not packaged or provided for quick and easy assembly to form a predetermined completed structure that also provides for an almost continuously insulated and energy efficient structure that is also stable and reliable, i.e., able to withstand the natural elements including storm conditions or man-made elements like hostile fire or blasts.

SUMMARY OF THE INVENTION

The present invention provides modular building systems with integrated electronic technologies. One aspect of the present invention is to provide modular building panels with embedded electrical supply components and embedded electronic devices. Another aspect of the present invention is to provide a modular building constructed with the modular building panels, the building controlled by a central computer system in communication with the embedded electronic devices in the panels. These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 1A is a standard flat wall panel. FIG. 1B is a 90-degree corner panel. FIG. 1C is a 135-degree transition panel. FIG. 1D is a wall panel with a window opening. FIG. 1E is a wall panel with a door opening.

in FIG. 7A a top view of two edges of modular wall panels having mating multi (two or more) railing for alignment and locking mechanism; FIG. 7B illustrates an end perspective view illustrating the parallel spaced apart multi-track or railing system; FIG. 7C illustrates a side view and cut-away of joined panel edges with the interlocking cam-based locking mechanism. While the interlocking cam mechanism is desirable for providing additional securement at the joints between two panels, it is not a requirement for some level of stability.

FIG. 9A shows a partially assembled building.

PRIOR ART

FIG. 15A is a cross-sectional view through the center of the header. FIG. 15B is a cross-sectional view through the end of the header. FIG. 15C is a cross-sectional side view.

FIG. 16A is a cut-away side view of a side wall with embedded conduits and junctions. FIG. 16B is a cut-away side view of an end wall with embedded conduits and junctions. FIG. 16C is a cut-away side view of another end wall with a door and embedded conduits and junctions. FIG. 16D is a cut-away side view of a side wall with a window and embedded conduits and junctions.

FIG. 17A is a cross section top-down view of a prefabricated building panel with embedded modular electronics technology that is either embedded at the factory prior to delivery to the build-site or simply have a socket for future receipt of a desired technology module to be installed after future purchase by someone who controls the finished building FIG. 17B is a semi-transparent, perspective view of a panel with a 4-way chase.

FIG. 20A is an exterior perspective view showing the camera.

FIG. 20B is a cross-sectional side view showing the camera monitor and chase. FIG. 20C is an interior partially transparent, perspective view showing the monitor and chase for power connection.

FIG. 23A is a transparent view of a panel with a single sensor. FIG. 23B is a side view of a panel with a single sensor. FIG. 23C is a transparent view of a panel with multiple sensors. FIG. 23D is a side view of a panel with multiple sensors.

FIG. 24 illustrates the structural siding materials of the panels employing complimentary technologies useful in building envelope construction such as embedded housewrap employed by the Huber ZIP System sheathing offering both a water resistant barrier and an air barrier for the panel skin.

FIG. 25 illustrates the structural siding materials of the panels employ. Complimentary technologies useful in building envelope construction such as a flame-resistant coating such as that found on structural grade sheathing in Louisiana Pacific's FlameBlock fire-rated OSB sheathing are used to provide fire resistance to the building panel.

FIGS. 26A&B are exterior and side views, respectively, illustrating vertically oriented straps integrated into the assembly of the prefabricated panel.

FIGS. 27A-D PRIOR ART illustrate a prior art cam-lock system. FIG. 27A is a top view of the locking point. FIG. 27B is a side view of the locking point. FIG. 27C is a top view of the strike. FIG. 27D is a side view of the strike.

FIG. 28A is a top view of the anchor flange attached to a cam lock.

FIGS. 29A&B illustrate a system for reinforcing camlocks with cable according to the present invention. FIG. 29A is a side view of a panel with two pairs of cam-locks individually reinforced with cable. FIG. 29B is a side view of a panel with two pairs of cam-locks reinforced with a single cable.

FIG. 30A is a side view of the cam-lock access shaft.

FIGS. 33&34A-C PRIOR ART illustrate prior art T-nuts. FIG. 33 is a perspective view of a prior art T-nut. FIG. 34A is a cut-away view of a prior art T-nut embedded in wood. FIG. 34B is a cross-sectional side view of the T-nut. FIG. 34C is a top view of the T-nut.

FIG. 35A is a side view of the cam-lock access shaft.

FIG. 38 illustrate a bracket according to the present invention.

FIG. 39 illustrates a bracket mounted in a cam-lock according to the present invention.

FIG. 40 illustrates another embodiment of a bracket mounted in a cam-lock according to the present invention.

FIGS. 41A-C illustrate steps for assembling structures using the cam-lock/bracket system according to the present invention. FIG. 41A shows building panels locked together with cam-locks. FIG. 41B shows utility structural supporting rods and ledgers mounted on the panels. FIG. 41C shows a bed and cabinet mounted to the utility structural supporting rods.

FIGS. 42A-C illustrate embedded structural members inside of insulated building panels in different locations and orientations as part of a system for up-armoring or structurally reinforcing a building according to the present invention. FIG. 42A is a transparent view of a horizontally oriented structural member embedded in a panel. FIG. 42B is a transparent view of a vertically oriented structural member embedded in a panel. FIG. 42C is another transparent view of vertically oriented structural member as embedded in the supporting foam core.

FIGS. 44A-D illustrates various embodiments of a building with embedded structural members for up-armoring a building according to the present invention. FIG. 44A is a transparent view of a side wall composed of several panels with a window and embedded structural members. FIG. 44B is a transparent view of an end wall composed of several panels with embedded structural members. FIG. 44C is a transparent view of an end wall composed of several panels with a door and embedded structural members. FIG. 44D is a view of a side wall covered with armor.

DETAILED DESCRIPTION

Figure 1E:
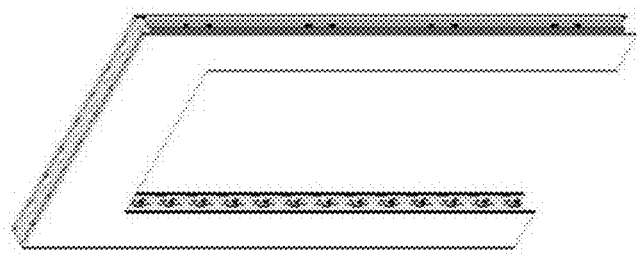
FIGS. 1A-E illustrate example application specific standardized panels (ASSPs) according to the present invention.
Figure 1D:
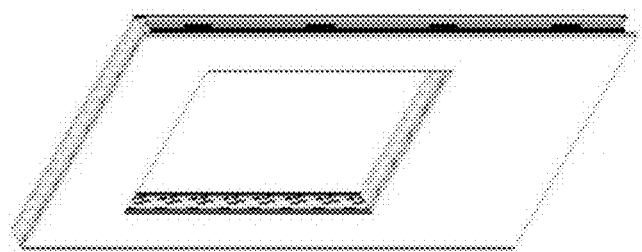
Figure 1C:
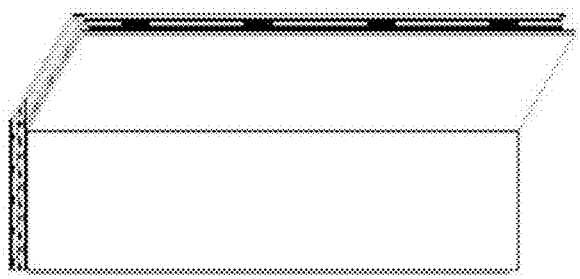
Figure 1B:
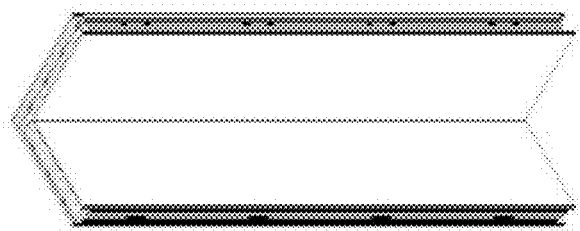
Figure 1A:
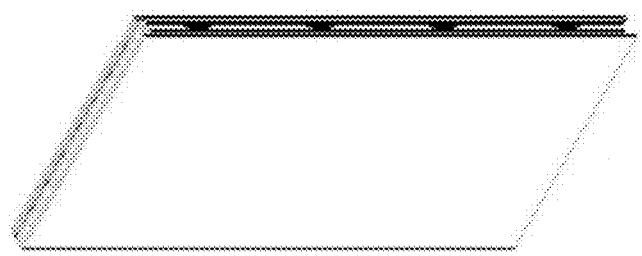

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

None of the prior art addresses the longstanding need for stable, energy efficient modular building structures, including kits for installing same, in particular having an almost continuously insulated and structurally locked wall, floor and roof panel components that are aligned with a mating edge system with the potential for embedding additional technologies inside of the panels. Thus there remains a need for energy efficient and stable modular building systems and methods for installing them, including providing containerized packaging to facilitate shipment, assembly and installation of the building offering improved value for the consumer through integrated technologies The present invention provides systems and methods for a modular building that is self-contained within a standard shipping container, wherein the pre-fabricated panel wall components are easily assembled to form a predetermined structure using a cam-based component connector system. Another aspect of the present invention is to provide a modular building system for a portable, storable complete building kit wherein the kit is completely optimally provided within a standard shipping container or other pre-specified configuration or delivery mechanism. The present invention also provides a modular building system with prefabricated composite wall panels that include conduits provided within the panels; alternatively, these conduits may be pre-wired. As shown in FIGS. 1a through 1e, each panel is separately a structural element to be used in construction. While framing lumber, structural sheathing and insulation are traditionally sold separately, a structural insulated panel combines the capability of all three materials yet with a significantly reduced amount of framing lumber and therefore much less energy loss through thermal bridging of the building envelope. And while normal structural insulated panels are sold as part of a kit to be assembled as a set, ASSP can be sold separately as money becomes available. The panels are thus assembled in any number of alternative configurations and moved around as desired by the owner, allowing them to create an almost infinite number of designs from a very limited number of panel types.

In another embodiment, the continuously insulated panels are angled in shape or forming a t-wall or other multi-segment single panel to aid in both strength and structure assembly such that they tessellate. Other regular and irregular shapes that tessellate are provided for in the present invention.

Methods for installation of the modular building system include the steps of providing a prefabricated modular building kit having all components and instructions for assembly optimally disposed within a standard shipping container for portability and storage; removing the kit from the shipping container; assembling the modular housing by arranging and connecting the composite wall panels, which include conduits for electrical and/or plumbing disposed within the interior section of the composite wall panels, including input/output openings for wiring, and complimentary technologies like lighting, cameras, sensors, etc.

The structure size is predetermined before packaging or panels erected as changing conditions require, but ranges in size from small to very large buildings, by way of example and not limitation, such as an emergency shelter, a home or a command shelter or office or simply as an item of convenience for a consumer. The size of the panels generally requires only two or three persons to manually maneuver the panels for complete structure erection. The material of both the interior and the exterior siding of the panels is selected based upon the needs of the customer and the environment, but in any case the panels are both insulated and portable. Preferably, the panels are super-insulated and portable to allow the builder to get under roof and into a comfortable space in a very short period of time.

In another embodiment, a structural insulated panel has a finished exterior that provides a drainage plane over which other siding is applied.

Referring now to the drawings in general, the illustrations are for the purpose of describing a preferred embodiment of the invention and are not intended to limit the invention thereto. As best seen in the figures, especially FIGS. 2-6, an illustration of a container for housing a modular building kit is shown; in FIGS. 7-8, a modular building materials are shown including interlocking pre-engineered and pre-insulated panels that are constructed and configured to be quickly attached together by properly aligning their respective edges to form the walls, roof, or floor of a structure.

Figure 2:
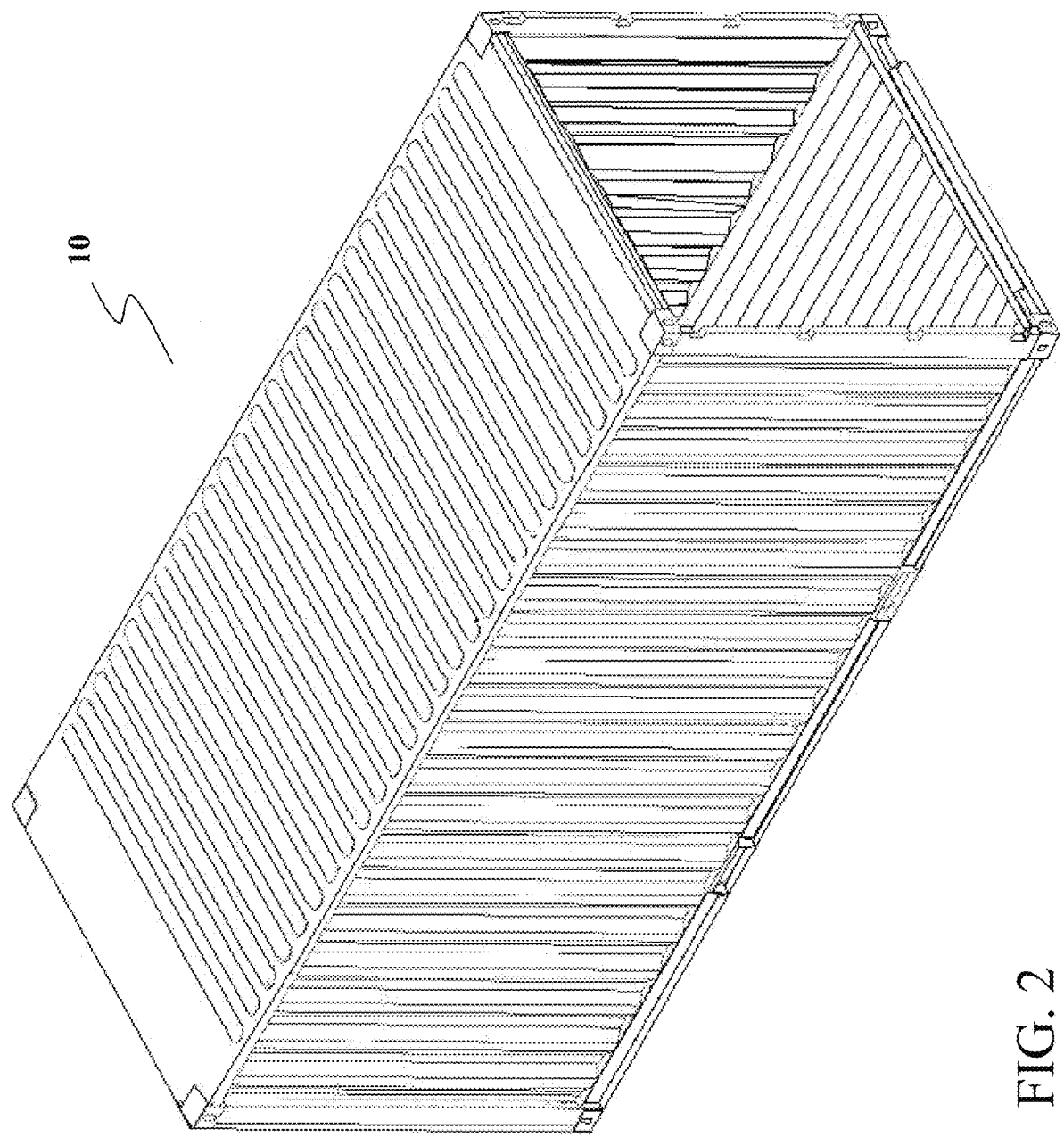
FIG. 2 shows a perspective view of a container for housing the modular building system according to one embodiment of the present invention.
Figure 3:
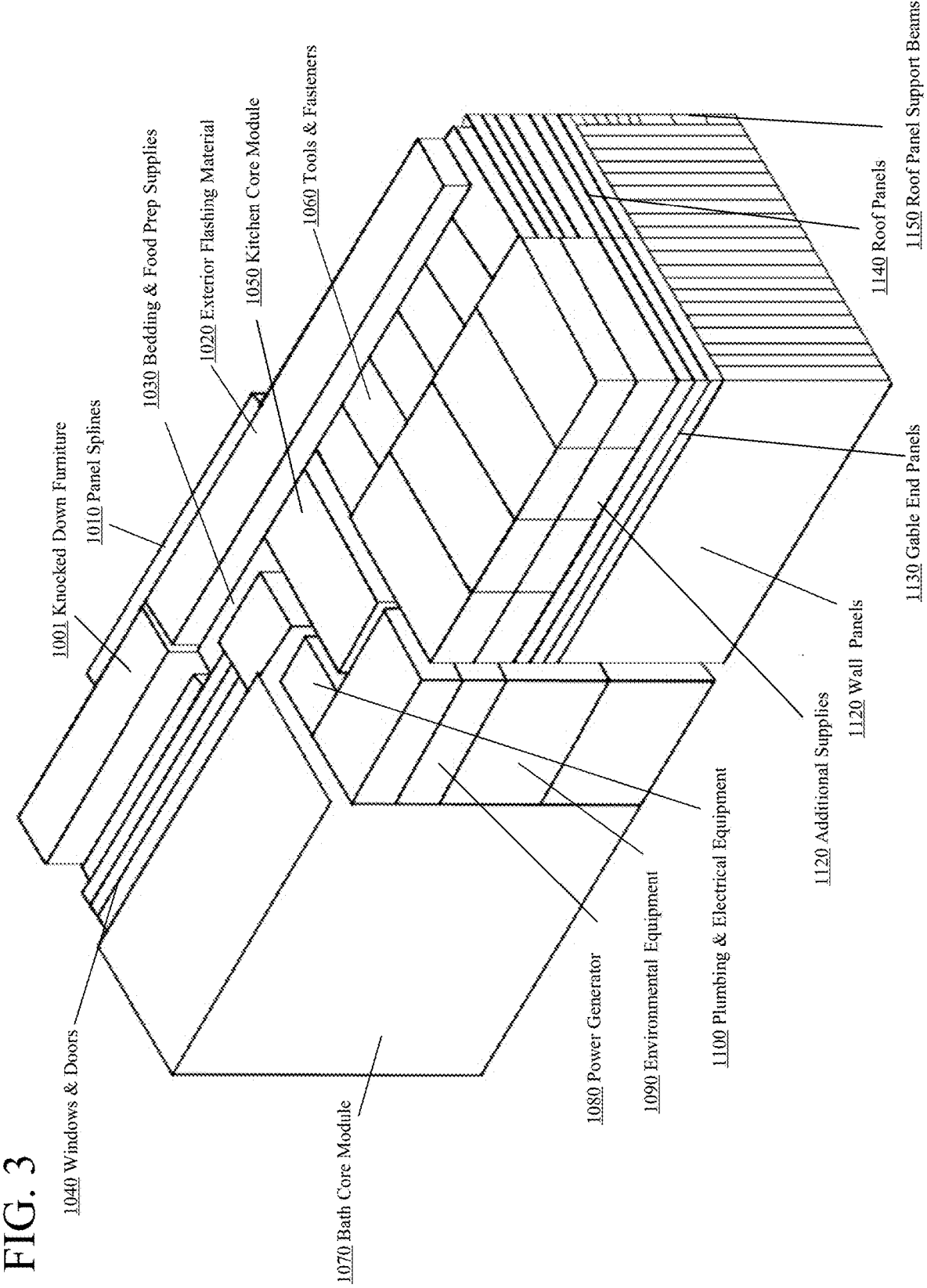
FIG. 3 illustrates a perspective view of stacked contents of the kit for modular building structures of the present invention, configured to fit within the container shown in FIG. 2.
Figure 4:
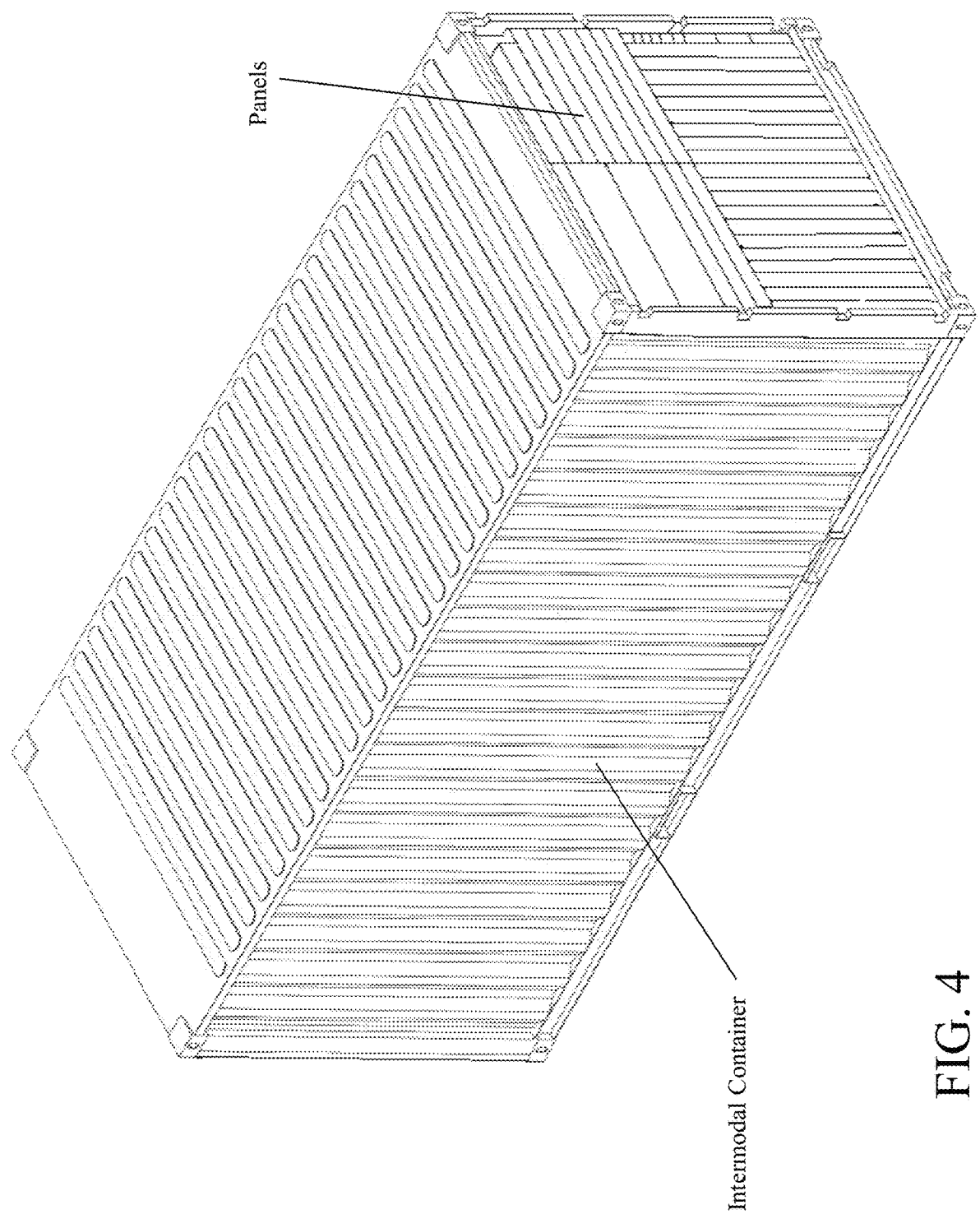
FIG. 4 shows a loaded container of FIG. 2 with the components of FIG. 3.
Figure 5:
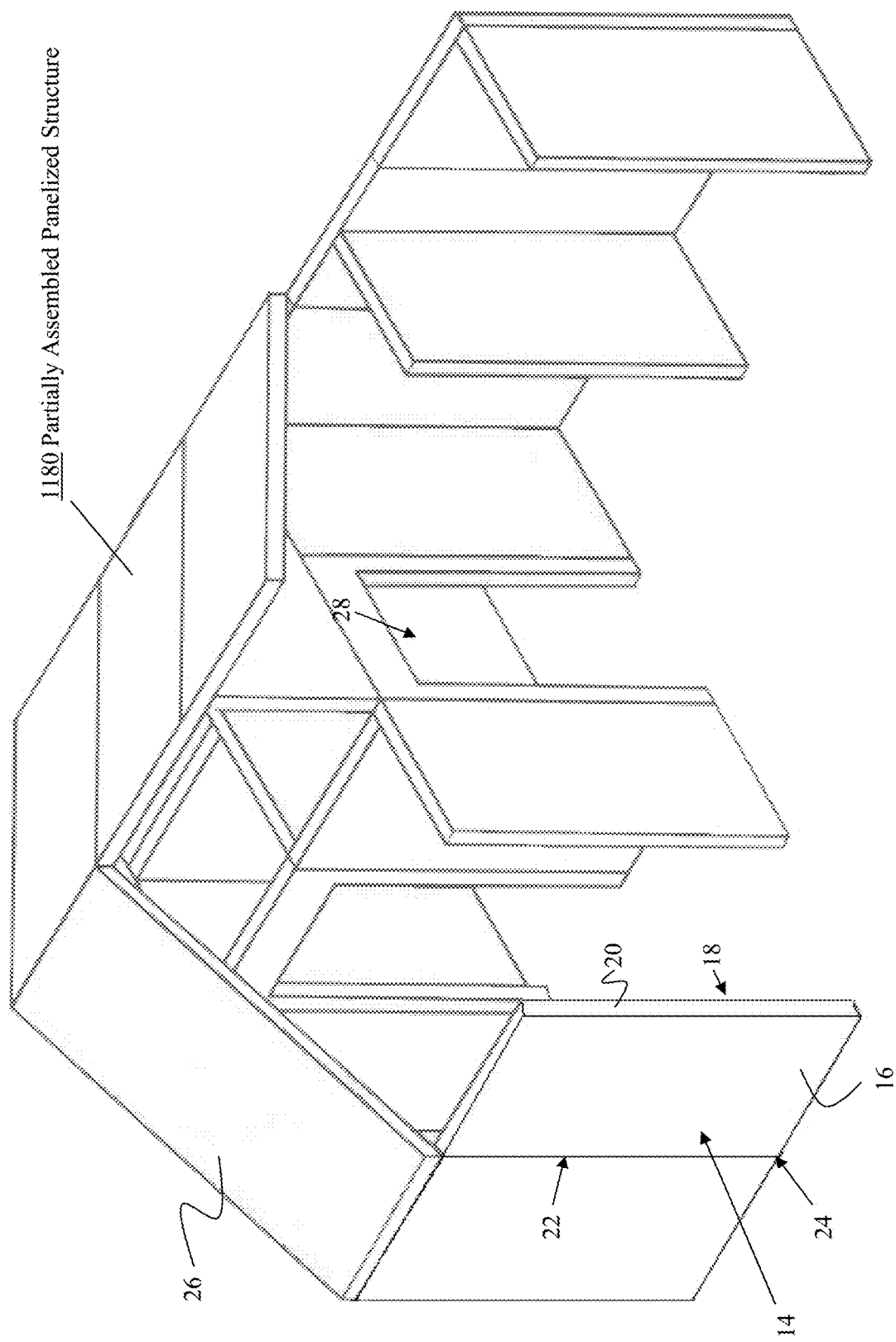
FIG. 5 illustrates a perspective view of a partially assembled modular building structure.
Figure 6:
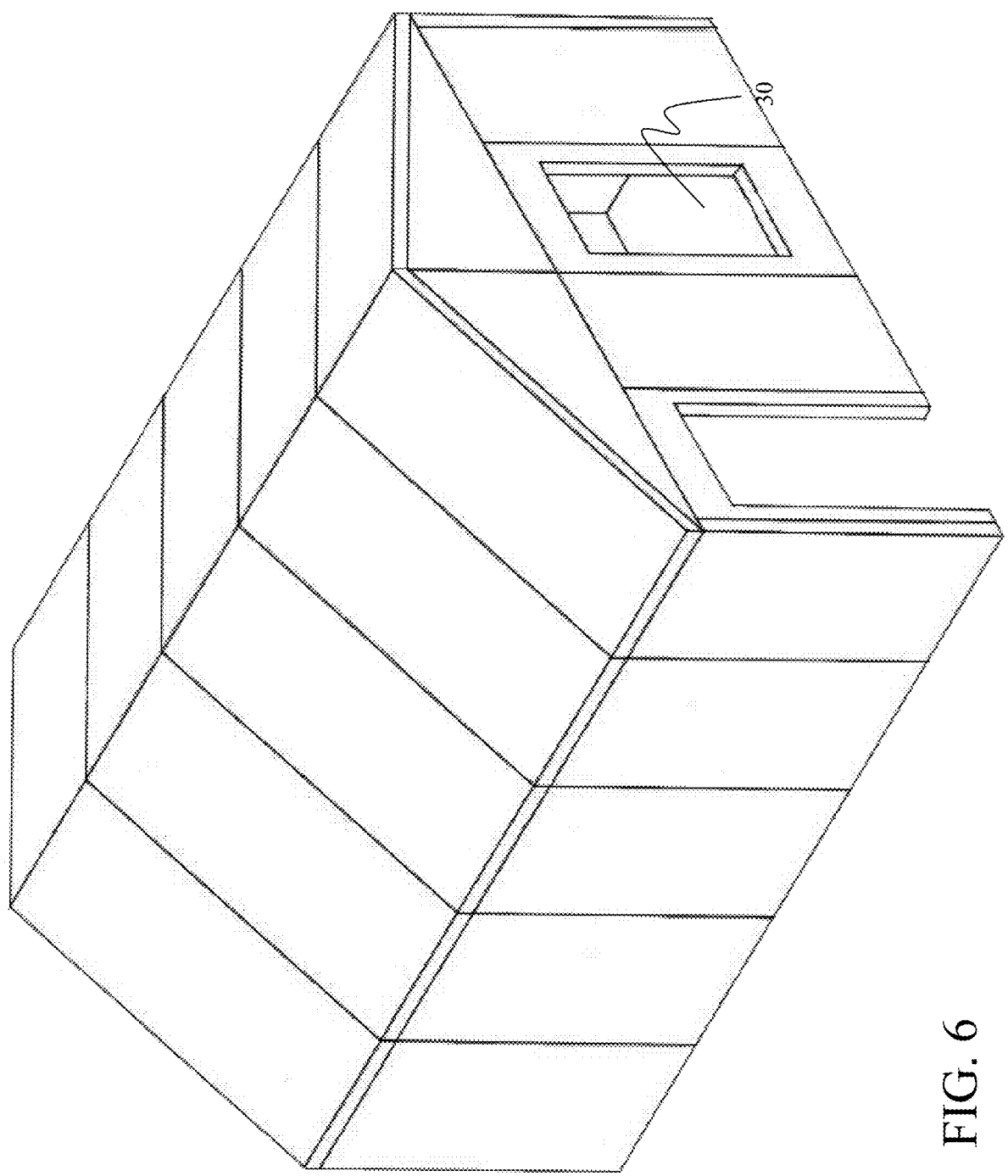
FIG. 6 illustrates a perspective view of a completed modular building from the partially completed illustration of FIG. 5.
Figure 7A:
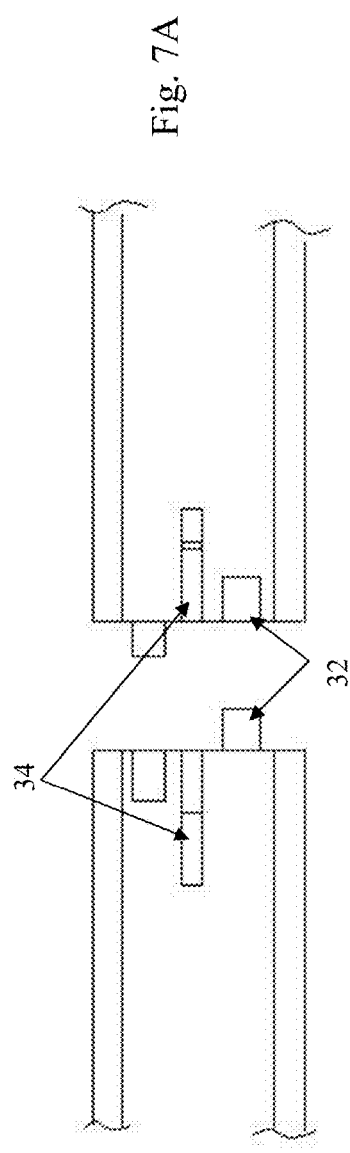
FIGS. 7A-C illustrate several related views.
Figure 7B:
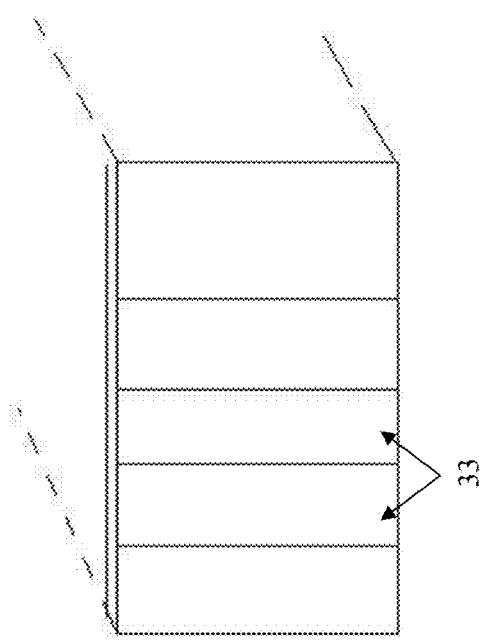
Figure 7C:
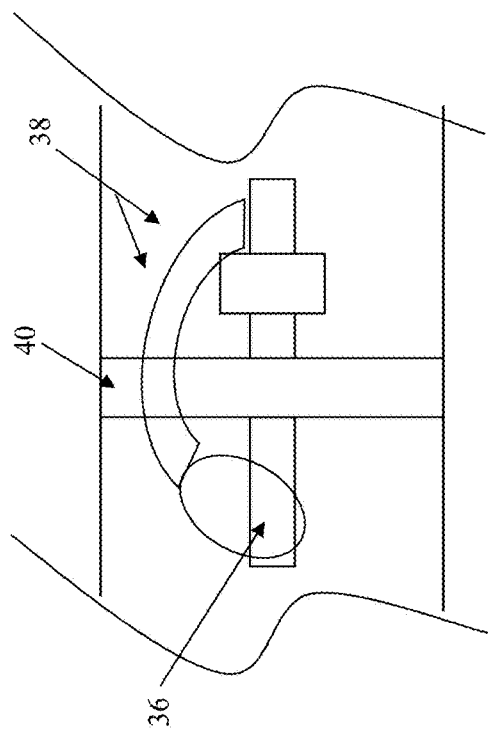
Figure 8:
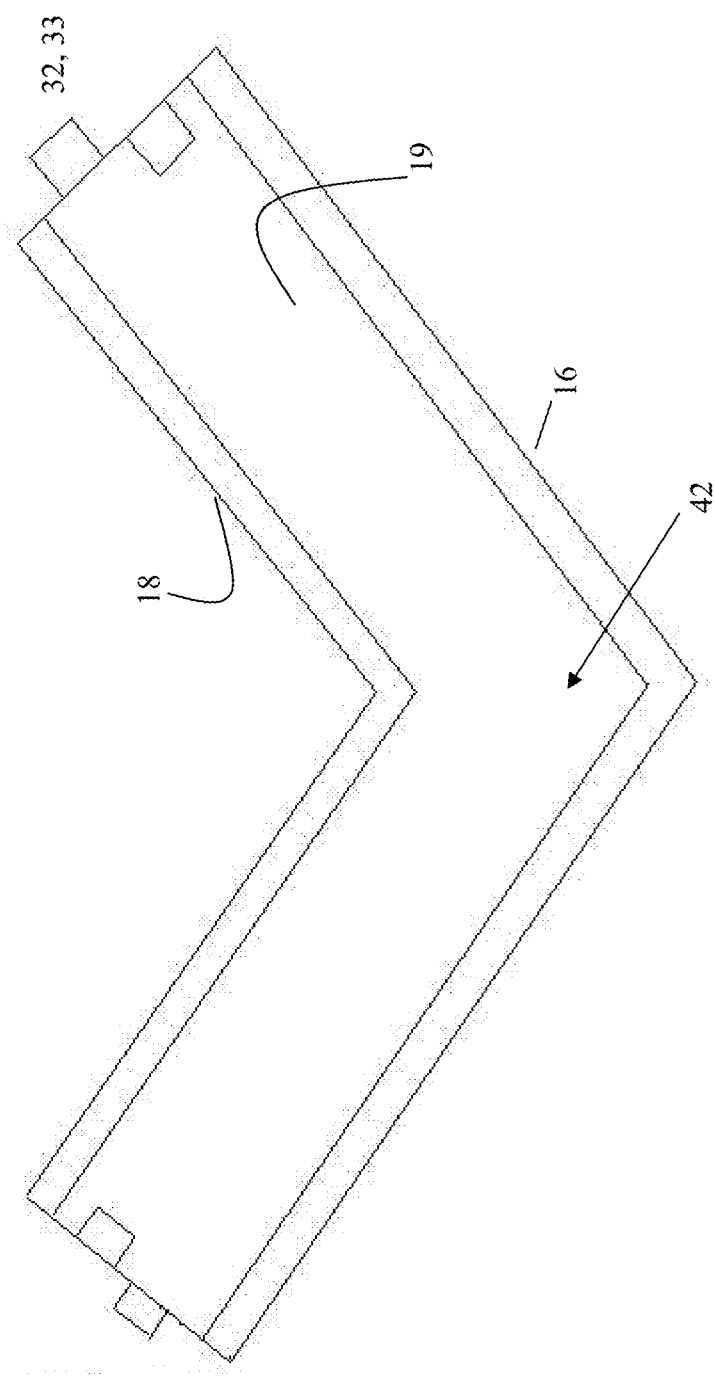
FIG. 8 illustrates a top view of a corner wall panel modular component with seamless corner having continuous insulation to eliminate thermal bridging.
Figure 9A:
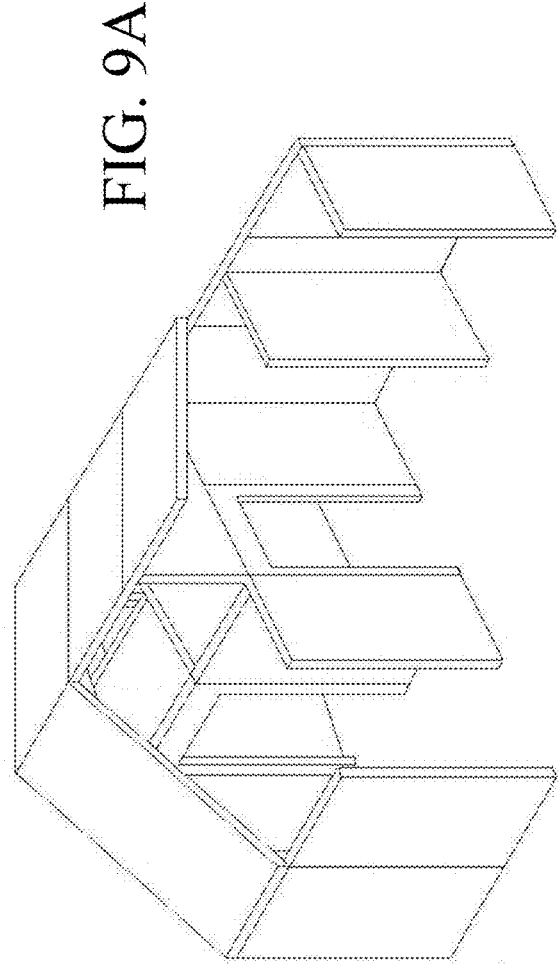
FIGS. 9A and B illustrate perspective views of the modular building components in various stages of installation.
Figure 9B:
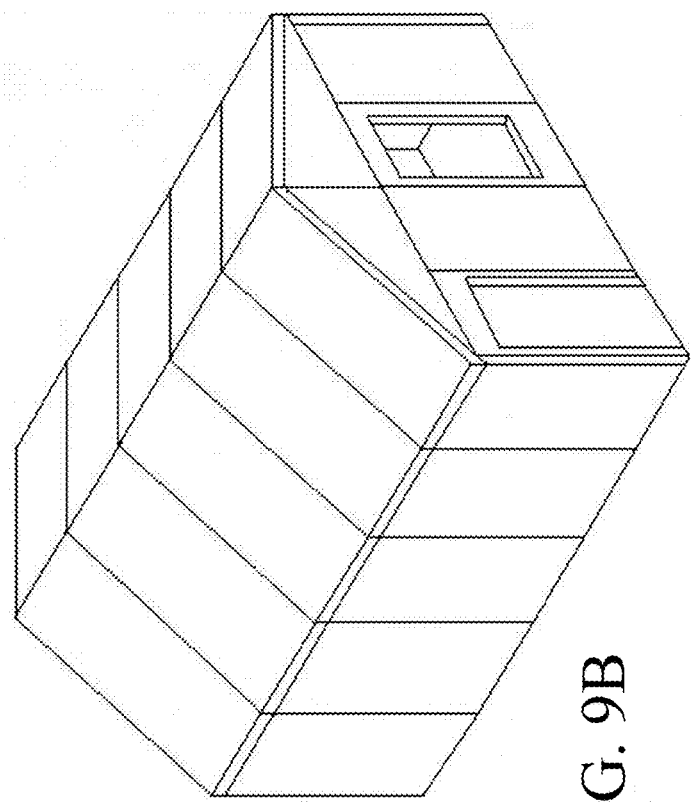
FIG. 9B shows a completely assembled building.
Figure 45:
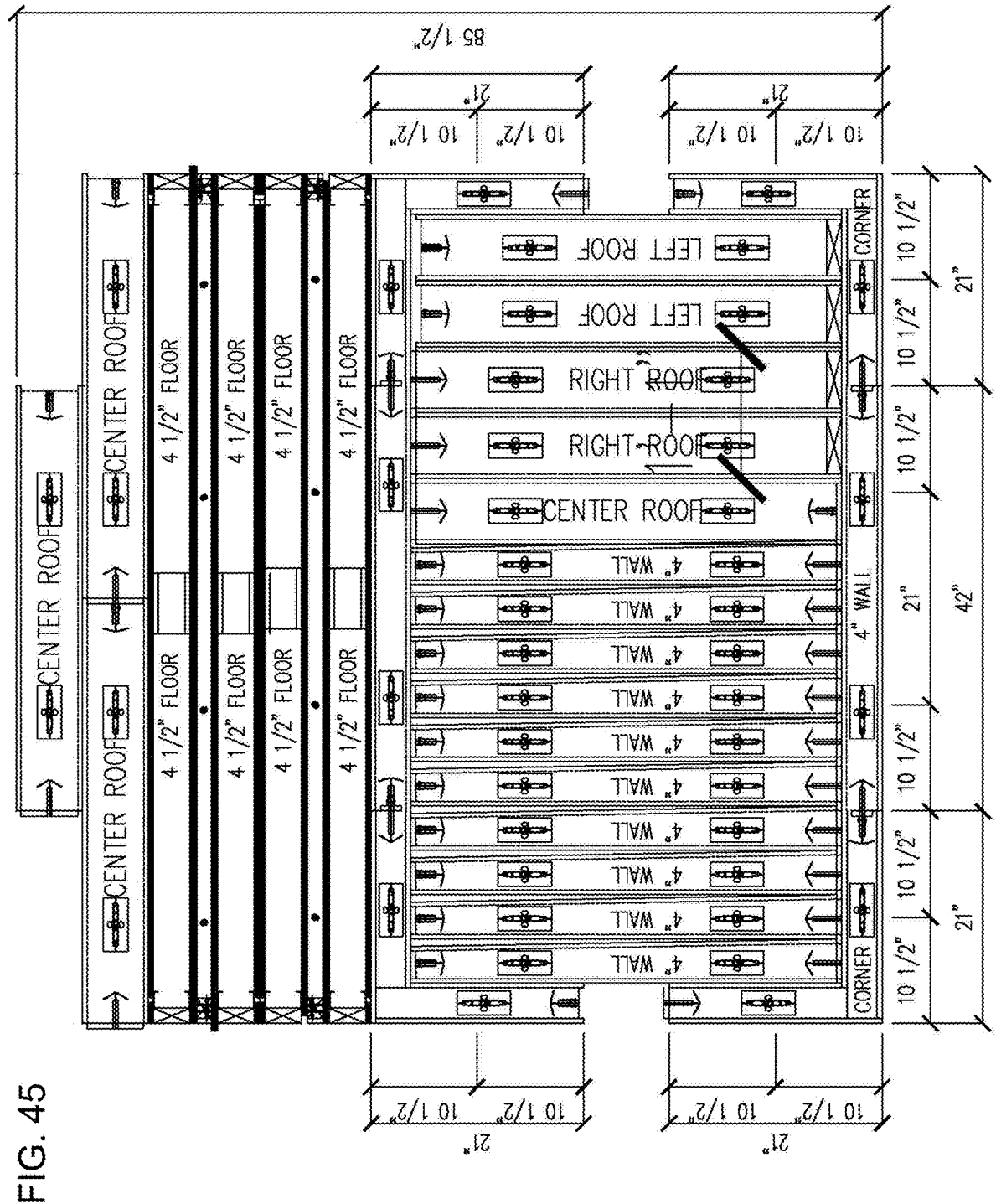
FIG. 45 illustrates a side view of a knock-down building packaged using the corner panels to hold and protect the flat panels.

FIG. 2 shows a perspective view of a container 10 for housing the modular building system according to one embodiment of the present invention. FIG. 3 illustrates a perspective view of stacked contents of the kit for modular building structures as one example (since not all will require the same materials) of the present invention, configured to fit within the container shown in FIG. 2; the contents of this illustration include furniture 1001, panel splines 1010, bedding & food prep supplies 1030, windows & doors 1040, exterior flashing material 1020, kitchen core module 1050, tools & fasteners 1060, bath core module 1070, power generator 1080, environmental equipment 1090, plumbing & electrical equipment 1100, additional supplies 1120, wall panels 1128, gable end panels 1130, roof panels 1140, and roof panel support beams 1150. FIG. 4 shows a loaded container 12 of FIG. 2 with the components of FIG. 3. FIG. 45 illustrates a side view of a knock-down building packaged using the corner panels to hold and protect the flat panels. FIG. 5 illustrates a perspective view of a partially assembled modular building structure 1180, including door component 28, wall panel edges 20, 22, wall panel face side 16, and back side 18, wall panel (generally referenced 14), joined edges or seam 24, roof panel 26. FIG. 6 shows a perspective view of a completed modular building from the partially completed illustration of FIG. 5 including a window unit 30. FIG. 7A-C illustrate several related views; in FIG. 7A a top view of two edges of modular wall panels having mating double railing 32 for alignment and locking mechanism 34; FIG. 7B illustrates an end perspective view illustrating the parallel spaced apart double track or railing system 33; FIG. 7C illustrates a side view and cut-away of joined panel edges with the interlocking cam-based locking mechanism (cam 36, locking arm 38, seam 40). FIG. 8 illustrates a top view of a corner wall panel modular component with a continuously insulated seamless corner 42 with insulation 19 a face side 16 and back side 18 of the wall panel, and double rail mating alignment components 32, 33. FIG. 9 illustrates several perspective views of the modular building components in various stages of installation.

Doors and windows are also preferably delivered with and included in the building kit. Preferably, openings for the windows and doors are pre-framed in the panels in a manner that allows for rapid window and door installation on site, without additional time or materials required for framing and installation. Doors and windows may also be pre-installed within individual panels at the factory prior to packing into the container. Roof beam pockets are also preferably pre-set in the top of panels to facilitate the placement of rafter or ridge beams to allow for the support of the insulated roof panels.

Magnetic Locking

Figure 10:
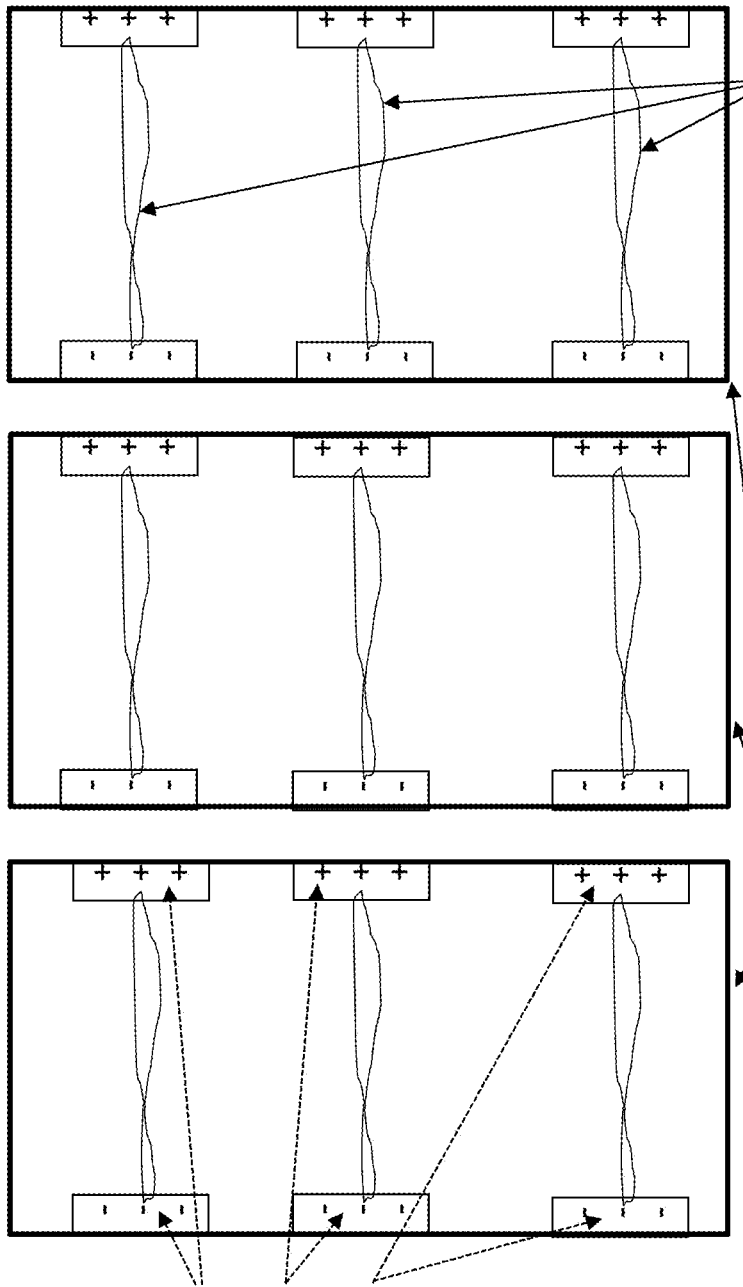
FIG. 10 illustrates a system for locking panels together with magnetic locks.

In an alternative embodiment, the panels are locked together with a magnetic locking system, generally described in FIG. 10. Magnets or electro-magnets on the opposing peripheries of a panel are further inter-connected via a rod or cable to each other contained within a single panel. In this manner the magnetic locking system connects an entire structure with structural reinforcement. The magnets may be permanent magnets or electro-magnets, which are rendered non-functional by either turning off the electric current for the electro-magnet or by sliding segments of a magnet orthogonally to the direction of the magnetic field to facilitate assembly or disassembly or electromagnets, which are activated once they are in place. Alternatively, the electromagnets are deactivated during normal conditions, and are activated or even increased in strength compared to normal operation during events that stress the structure, such as during earthquakes, hurricanes, tornados, floods, explosions, and the like.

Figure 11:
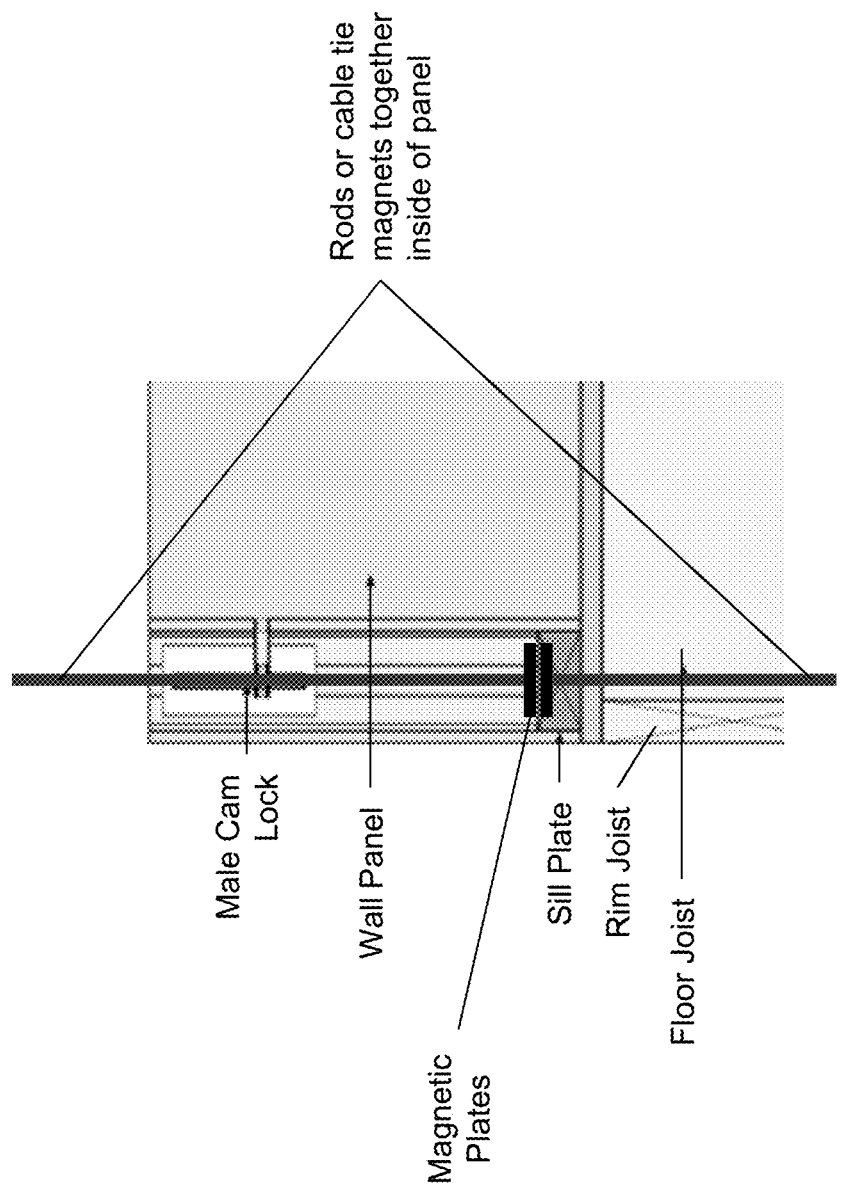
FIG. 11 illustrates a system for locking panels to other structures with magnetic locks.
Figure 12:
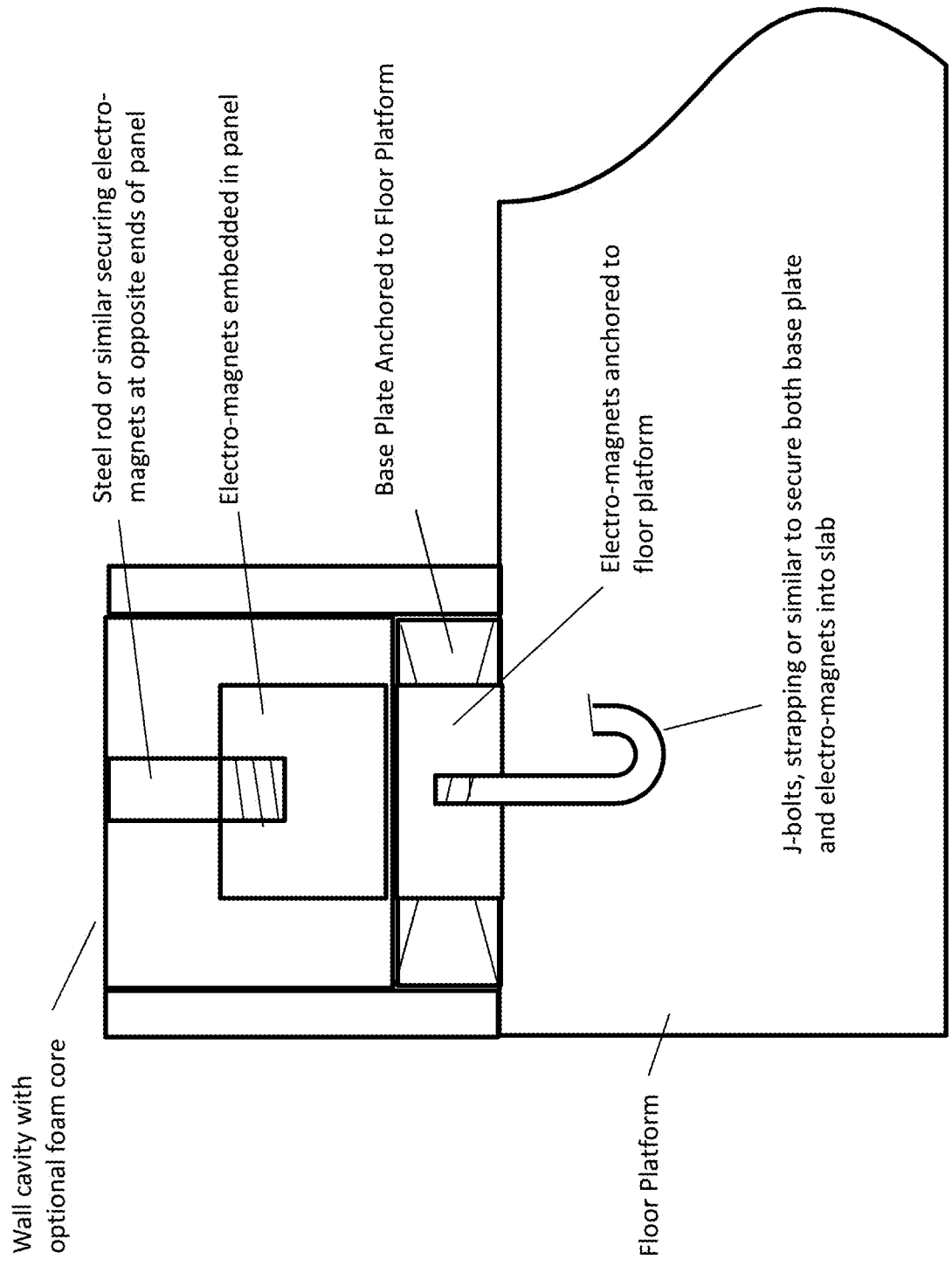
FIG. 12 illustrates another system for locking panels to other structures with magnetic locks.

Another magnetic locking system, used to anchor the structure to a floor or footing or to a truss or other structural member of a roof is shown in FIGS. 11 and 12. 9*a*. Not only is this magnetic locking system used to attach one panel to another panel, but it is also used to attach a panel to a non-panel structural member, or to attach two or more non-panel structural members to each other.

Header

Figure 13:
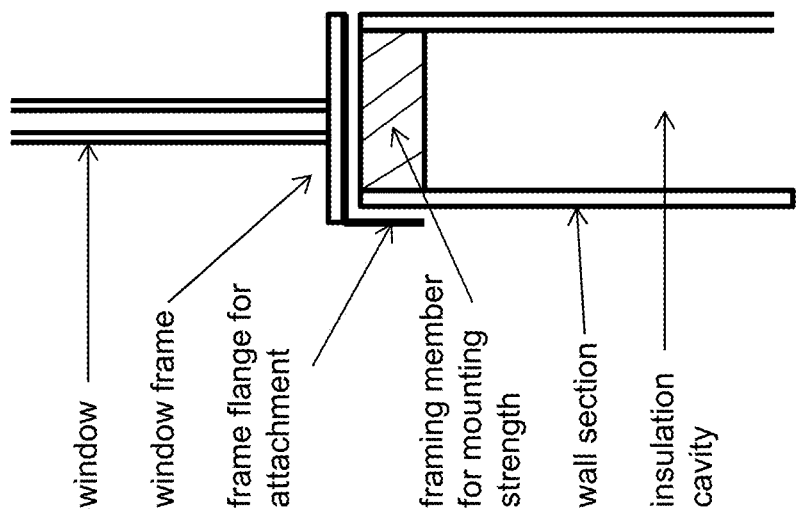
FIG. 13 illustrates a prior art header.
Figure 14:
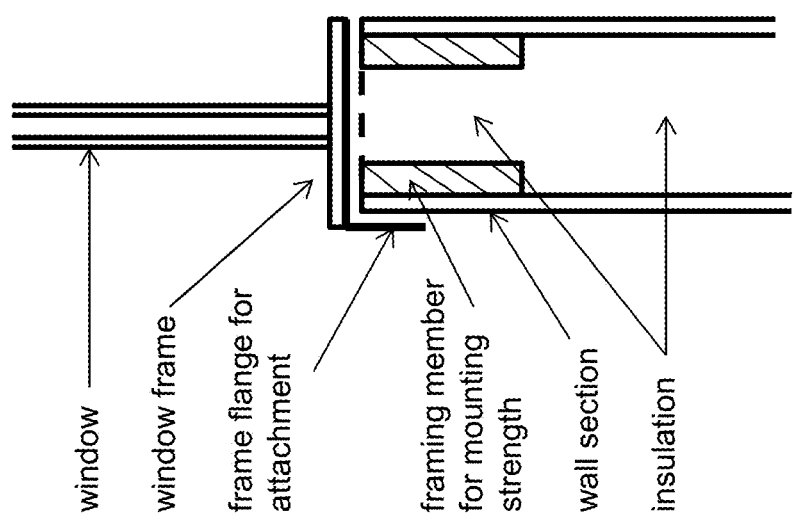
FIG. 14 illustrates a header according to the present invention.
Figures 15A, 15B, 15C:
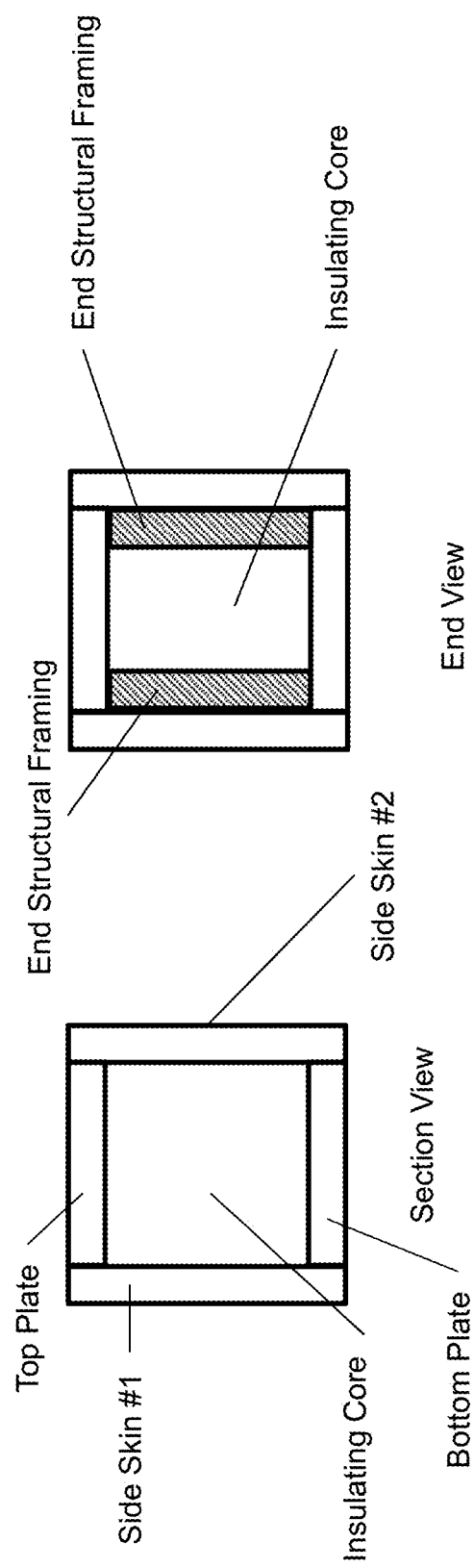
FIGS. 15A-C illustrate a header according to the present invention.
Figure 16B:
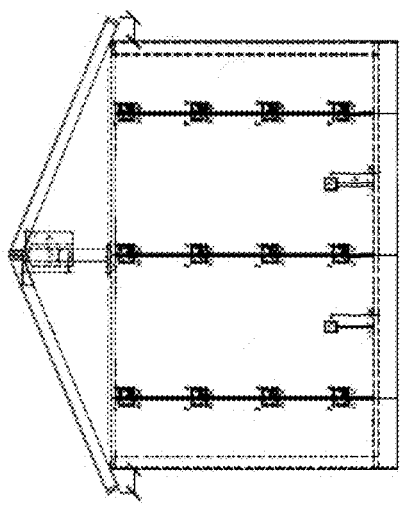
FIGS. 16A-D illustrates assembled panels with embedded conduits and junction.
Figure 16D:
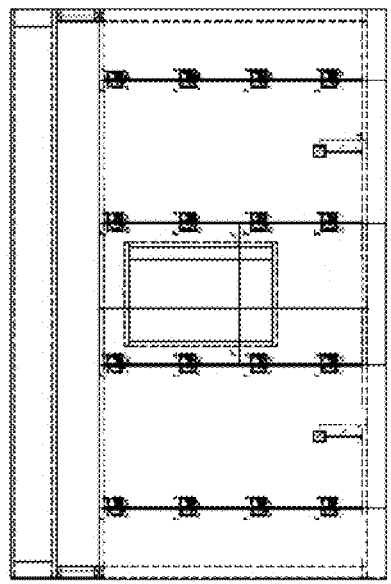
Figure 16A:
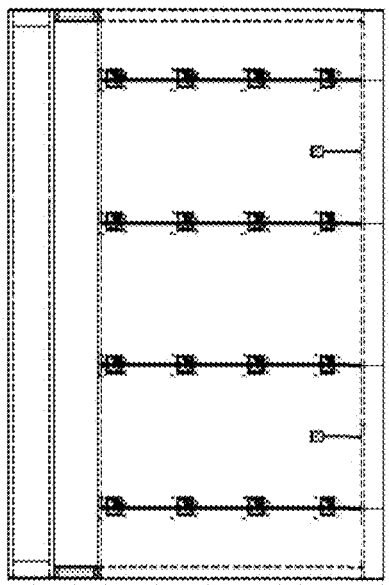
Figure 16C:
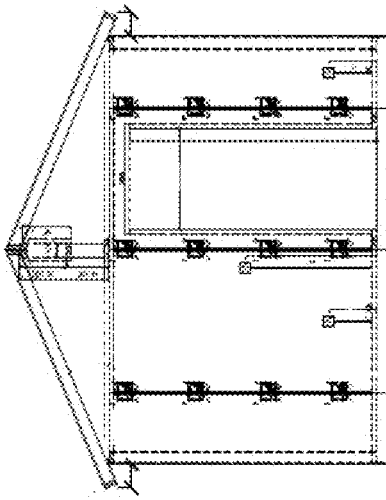

A header panel is a load bearing member that goes over a large opening like a window or a door. Standard industry practice is to have this member be a continuous framing member such as laminated veneer lumber (LVL) or similar and having very high strength but low insulation value. Prior Art FIG. 13 shows a standard wall section detail at a framed opening, which allows thermal bridging (energy loss) where the framing member bisects the wall. The present invention is an insulated box beam offering a continuous end-to-end insulated core and still offering very high structural strength. FIGS. 14 and 15A-C show this energy efficient method of mounting a window or door section. FIG. 14 shows a wall section detail at a framed opening where a continuous framing member has been replaced with a much more energy efficient configuration while still providing structure for window or door mounting. This figure attempts to show both a top and bottom chord (typically framing lumber) of the header or footer and its adjoining panel skins along with additional framing lumber at the ends of the header or footer to allow attachment to adjacent panel. Significant is that the End View shows that there is minimal thermal bridging from one side of the panel to the other while still retaining significant structural strength by virtue of the interior foam insulation.

Thus, the header or footer panel is provided that eliminates much of the thermal bridging normally associated with the framing of the opening for a window or door type panel.

Embedded Conduits

In another embodiment of the present invention, the present invention includes electrical supply components. The electrical supply components include electrical junction boxes, conduit and/or radiant heating coils, wherein the electrical supply components are preferably molded inside of the panels. Beneficially, the structure is assembled quickly and is pre-fitted with conduit (as delivered to the site in the self-contained kit, preferably in a shipping container), to allow for quick installation of a fully-equipped building, including electrical functionality (FIGS. 16A-D). The panels include a standardized box which is hot pluggable by consumers to facilitate changing out the modular device contained in the box. For example, the modular device is a standard electrical socket, or a networking interface, or a USB charger, or a sensor array. These modules also preferably include a locking mechanism, so that they can't be easily removed from the wall. This is useful in public buildings.

In another embodiment, the panels are pre-wired to include embedded technology modules, wherein the embedded technology modules include embedded data+power access points. In a preferred embodiment, these access points are mounted flush with the panel surface, and opened, for example by popping out, to provide a connection interface.

The present invention provides for pre-installation of devices in the panels. Thus, the panels arrive at the construction site with devices such as microphones or wireless transceivers already installed or easily inserted because receiving hardware is already installed within the panel.

Pluggable, embedded technology modules as provided for by the present invention are also used in structures that are not entirely built with the modular panels. The pluggable, embedded technology modules are configured for network connectivity. For example, in a building wherein only the ceiling is built with panels or not at all built with panels, a data/power access box in a panel in the ceiling is used for a pluggable light or a camera. In another example, in a building without panels these new technologies could be installed in sockets or receivers of the same or similar form factor, like a common 4"×4"×2" electrical box normally used for wall power outlets or light switches.

Lighting

The system provides for mounting LED lighting within the panels. For example, on the upper part of the wall, LEDs are mounted to provide illumination. The longevity of LEDs means that they rarely need to be changed. With ambient light sensors, they are also used to produce a constant amount of light making the space more pleasant.

Embedded Devices

Figure 18:
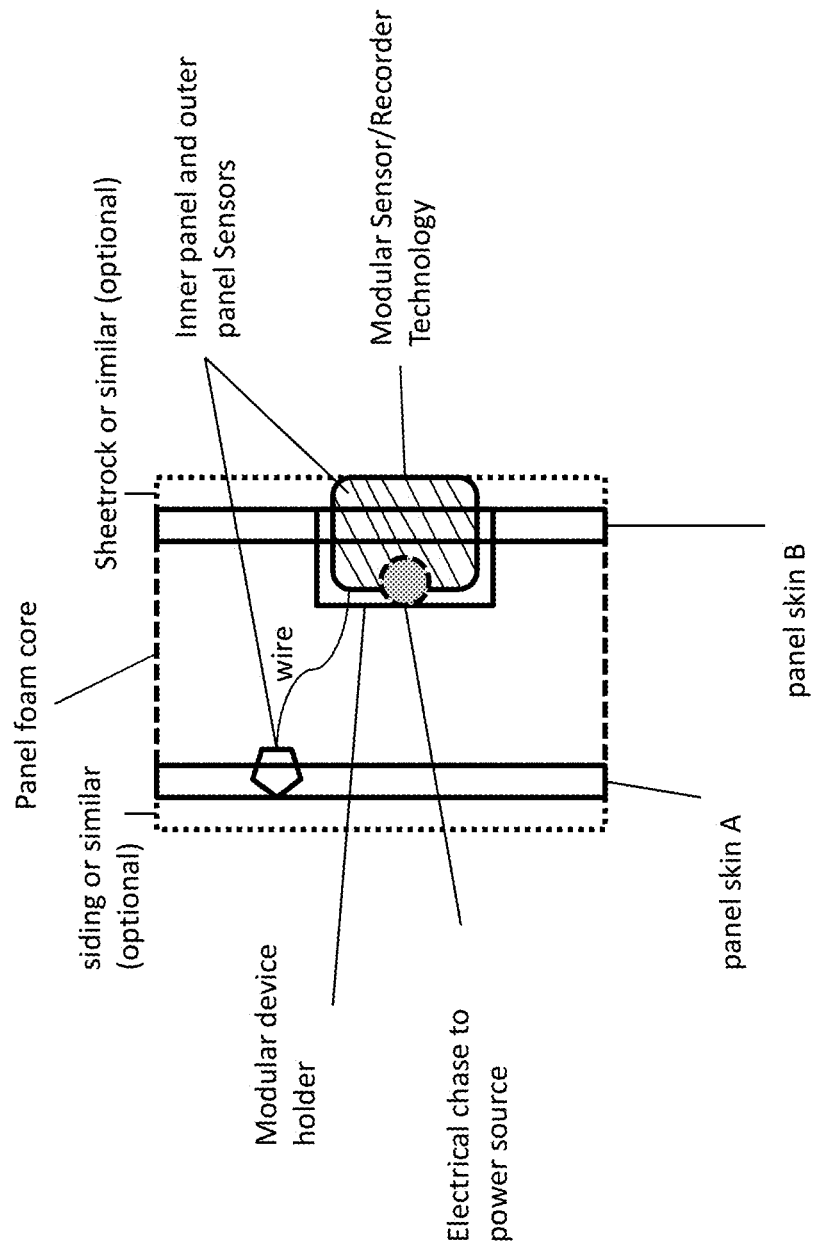
FIG. 18 is a cross section top-down view of a panel with embedded temperature, moisture and/or humidity sensors or any combination thereof.

As shown in FIG. 17A and FIG. 18, the panels are embedded with power technology, electronics, software, sensors, and network connectivity that enable them to collect and exchange data and control the structure and its accessories. Multiple technologies are utilized, ranging from wireless communication to the Internet and from embedded systems to micro-electromechanical systems (MEMS). Thus, the panels merge embedded systems, wireless sensor networks, control systems, and home and building automation into the structure. Electronics are embedded in panels at factory or on the job-site. FIG. 17B is a semi-transparent, perspective view of a panel with a 4-way chase. The 4-way chase allows circuits to be run from horizontally and vertically.

Figure 19:
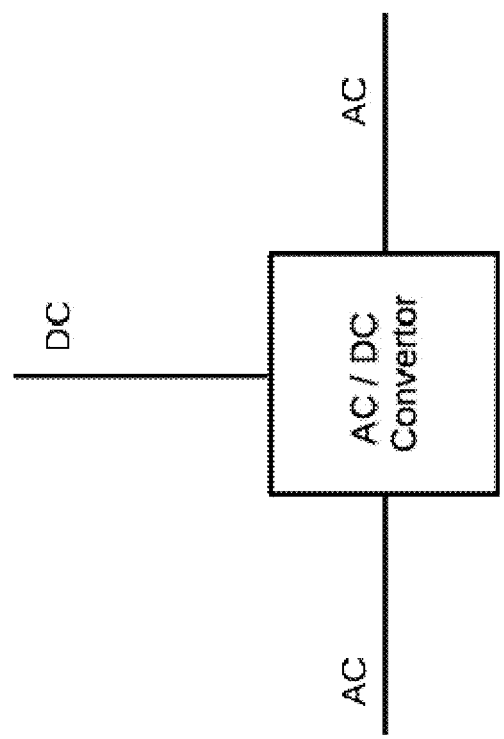
FIG. 19 illustrates a Texas Instruments port device for converting A/C power into D/C power.

The panels also include an AC/DC converter or inverter. For example, a Texas Instruments-port device (FIG. 19), which takes in AC power and then pass out DC power for lighting and other building management functions. The TI port box looks like a standard wired AC device, but it outputs a DC supply at an Intermediate Bus Voltage (IBV). IBV is preferred to be below 48V for safety reasons. In an embodiment, the output is floating.

Additionally or alternatively, the panel includes an AC/DC inverter, such that a DC electrical supply can be plugged into the system via one of the panels to power the system.

IR or light based communication devices are also used in the present invention. For example, these are used to turn off appliances, such as a TV or stereo, if no one is in the room. Likewise, ultrasonic communication is used in some embodiments.

In another embodiment, a power lines networking system is included. The system preferably has a security that is unique to the building.

The communication lines for the communication system are pre-installed or pulled through the same conduit (chase) as the power lines or having dedicated communications chases to prevent signal degradation through conflicting electrical fields.

Network Devices

Preferably, the embedded technology modules are modular network electronics, such as: wireless access point (router); wireless signal repeater; antennae; access control technology such as remote-controlled magnetic locking device for doors; and the like. FIG. 17 shows a panel with embedded wireless or data technology for standard residential installation. The panels include and/or are pre-configured to accommodate various networking technologies, including: RFID and near-field communication; bidirectional optical technology; optical tags and quick response codes; Bluetooth low energy; Low energy wireless IP networks, such as embedded radio in system-on-a-chip designs, lower power WiFi, and sub-GHz radio in an ISM band; ZigBee; Z-Wave; LTE-Advanced; WiFi-Direct and the like. These devices are connected wirelessly or via wires run through the chase. Any number of chases are provided in a panel, either independent or connected. FIGS. 17A and B illustrate a panel with a 4-way chase. In one embodiment, Smart RFID tags help ensure adjacent panels are supposed to be connected together.

Wireless relays are also be mounted to the access points to create or extend a communication network. The communication network created by the assembled panels are wired, wireless or combinations thereof. In a preferred embodiment, the panels contain wireless relays that provide a wireless mesh network.

Sensors and Recorders

In another embodiment, the embedded technology modules include sensor and recorder technologies. Preferably the sensor technologies are modular and either embedded during manufacturing or on the job-site. Information from either side of the panel or the interior of the panel is captured. By way of example and not limitation, sensors include: temperature sensors, humidity sensors, video, smoke/fire sensors, image capture (still image for comparison), air quality, radiofrequency (RF), gas ($CO_2$, CO, etc.), sound sensors (microphone), volatile organic carbons (VOC) sensors, ion mobility spectrometry (IMS), accelerometers, and motion sensors. Accelerometers can be used to determine if a panel is vibrating abnormally, and therefore indicate that the cam-locks might be failing. The sensors generate panel events, which are recorded in a database in the central computer system.

Recorders are also mounted with the sensors at the data access points (FIG. 18). By way of example and not limitation, video recorders are mounted with the video cameras.

Monitor "Window"

Figure 20:
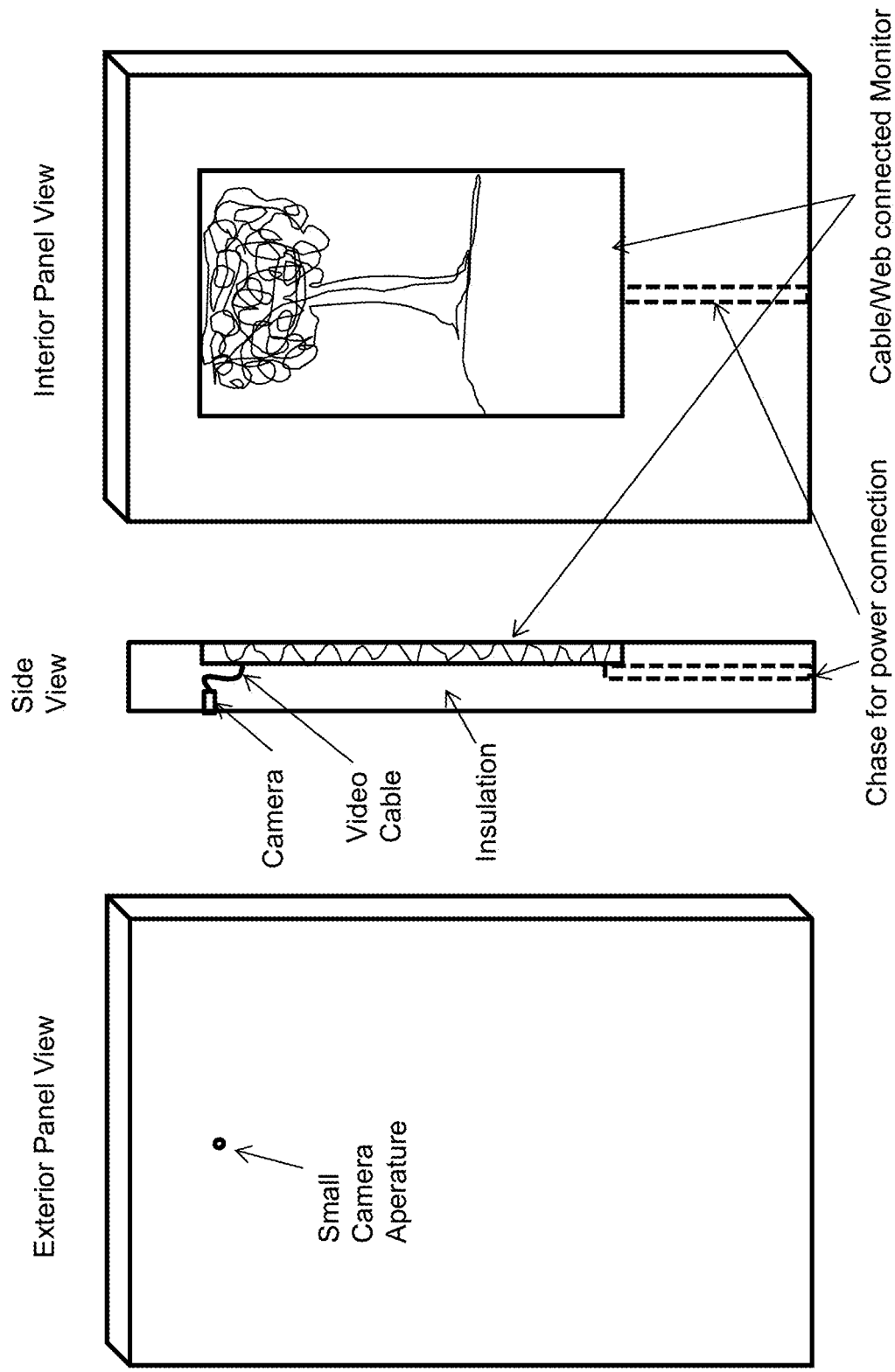
FIGS. 20A-C illustrates a panel with an external video camera and at least one interior monitor whose video signal either comes from the attached video camera or from another video source if panel is linked either by wire or wirelessly to another data source, such as the Internet.

Another type of panel provides an external video camera and at least one monitor mounted on, or embedded in, the interior side of the panel, thus providing inhabitants with a view of the exterior (FIGS. 20A-C). The "one-sided-window" is preferably a web-enabled camera and monitor embedded in a panel for energy saving, security and/or entertainment purposes. In an example embodiment, a small aperture high quality camera is mounted to penetrate the exterior of the panel skin and is connected to a video monitor viewable from the interior side of the panel, thus serving as both an inconspicuous surveillance device and as a "one sided window" offering a view of the outside. This system provides significantly higher insulation value than a standard window, thereby saving energy. Additionally, in another embodiment the monitor windows are mounted in the reverse direction beside a door, thereby providing external visitors with a view of the approaching occupant. These same panels are provided as skylights; enabling the user to control the amount of lighting throughout the day. The monitor windows are also used for teaching: when a particular topic is discussed, the windows change from a view of the exterior to the topic of discussion. The present invention also provides for a panel with a camera with a monitor mount. Thus, the panel with camera are shipped separately from the monitor.

Alternatively, a web-connected monitor allows a user to experience different vistas by connecting to remote cameras all over the world. For example, a viewer "wakes up in the Caribbean" by having a view from a Caribbean island transmitting in the morning. In conjunction with an exterior motion detector, the system switches to the exterior view when motion is detected; otherwise, the monitor displays a predetermined view.

Alternatively, a structure erected in Afghanistan could have camera/monitor panels allowing someone in Nevada to "remote monitor" the outside of the structure while the occupants slept in the interior or while they were not there at all. This is much like remote flying of an aerial drone.

Automatic door unlocking is also provided for, such that emergency response personnel can unlock the building quickly in case of medical emergency. The audio sensors with cameras and RF doppler are programmed to determine if an occupant has collapsed or is not moving when they are expected to, or gives an alert. Once the central computer system determines that there is an emergency situation, it alerts the appropriate emergency services. For example, in case of a fire, the fire department will be notified by the central computer system. If the building is occupied while on fire, the fire department and the EMS will be notified. The central computer system also unlocks the doors, windows and other access points, or alternatively enables the emergency unlock system, which allows the emergency services to unlock the doors, windows and other access points. When the emergency services arrive, they trigger a pre-determined electronic signal, such as an RFID or EMS band radio, which signals the doors and windows to unlock. In this manner, the access points cannot be unlocked by these emergency signals when there is no emergency.

Solar

Figure 21:
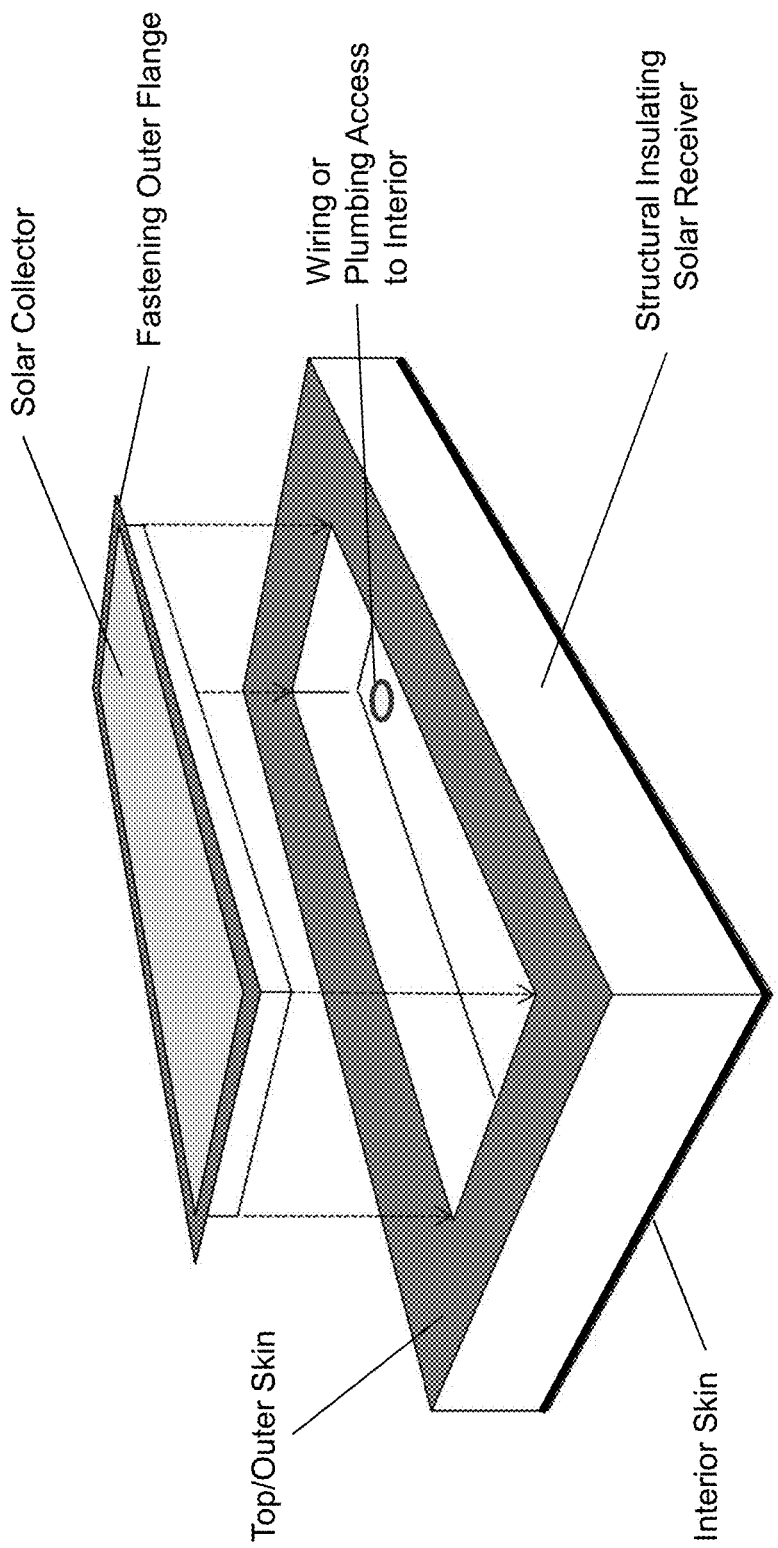
FIG. 21 illustrates a panel with an integrated solar collector.

In a preferred embodiment, as shown in FIG. 21, the solar panels are integrated with the building panels such that the exterior surface of each solar panel is ideally flush with the exterior surface of the building panel. A structural insulating panel is modified to receive a solar collector that produces either solar thermal or electrical energy for power or water or air heating.

Standard practice for the mounting of a solar collector panel is to mount it on top of the wall or roof panel as an entirely separate assembly. Large air cavities or gaps often exist between a solar thermal collector and the roof, for example, and this creates very large losses of thermal energy. By mounting a solar collector contained within an insulating wall or roof panel the efficiency of the thermal collector is increased while at the same time moving connections (plumbing or electrical) to the interior, where they are better protected.

Furthermore, in another embodiment the panels include concentrating photovoltaic systems comprising high efficiency multi junction solar cells that use optics to concentrate sunlight.

Climate Management System

Figure 22:
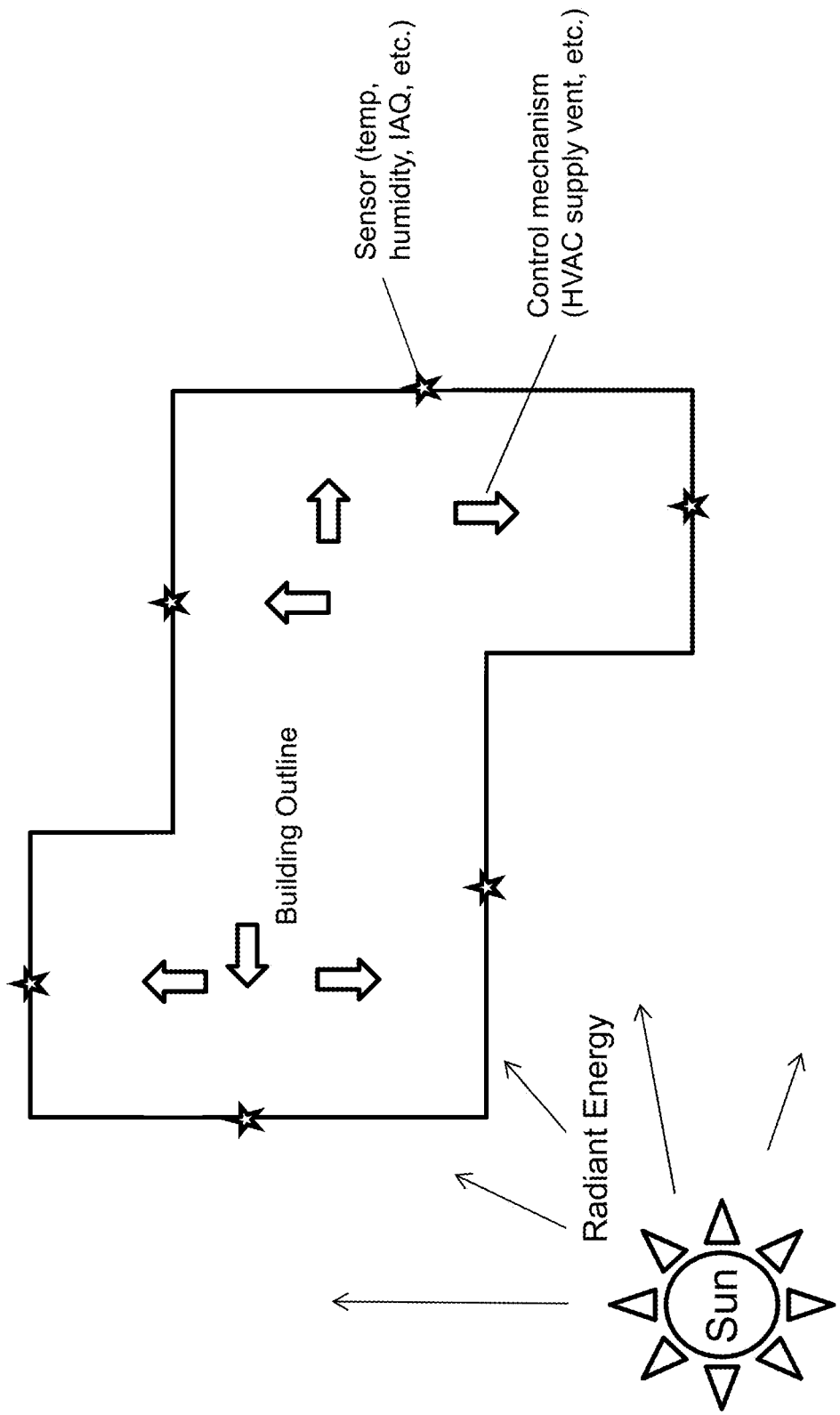
FIG. 22 illustrates a schematic diagram of a distributed sensor network for interior climate control.
Figure 23:
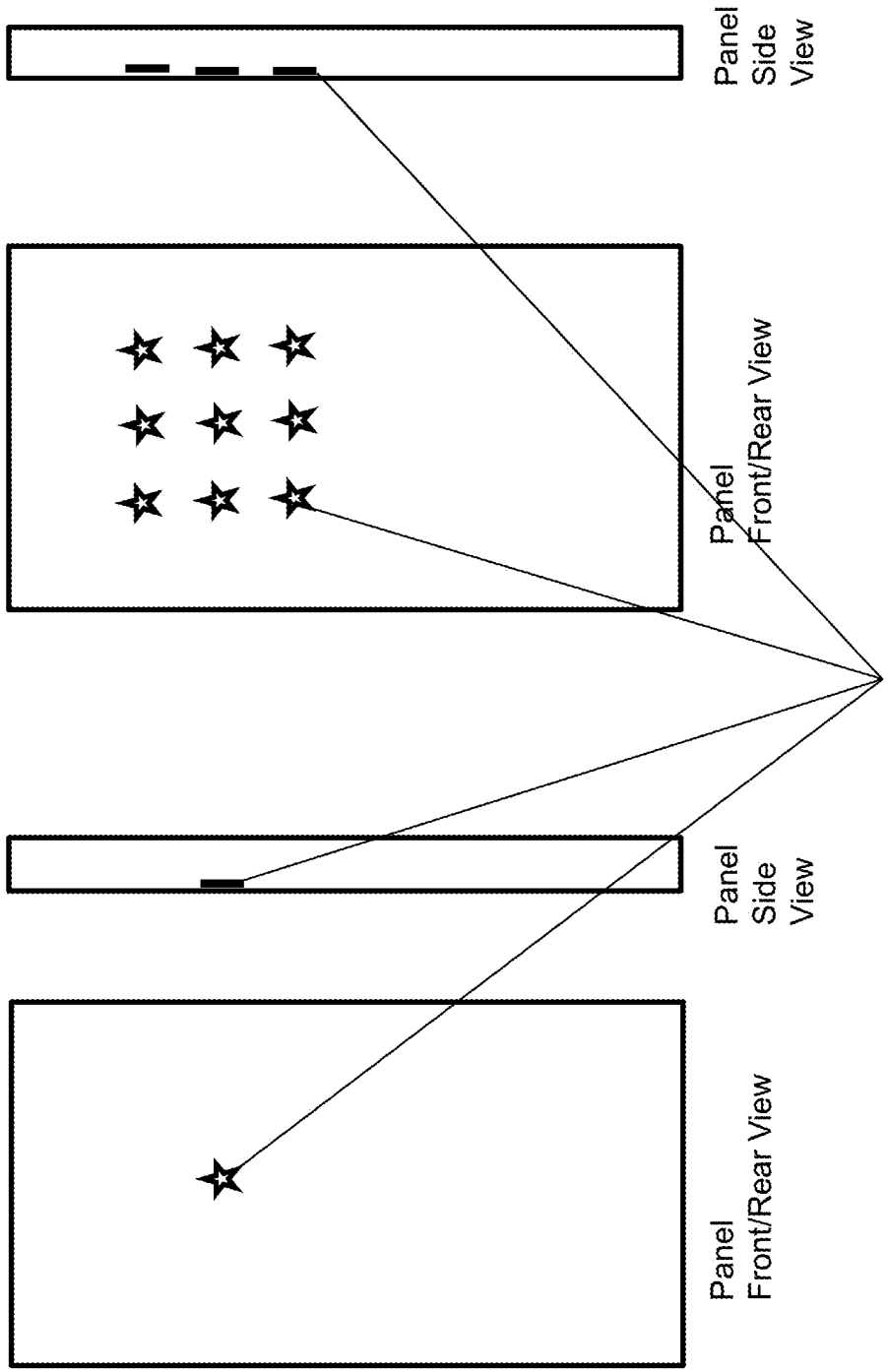
FIG. 23A-D Illustrate a wall panel with embedded sensors for controlling entry.

The invention provides for a climate management control (CMC) system (FIG. 22), which senses the external environment of the structure through the distribution of temperature sensors communicating through wireless technology with a central control point and embedded in panels at particular locations all around the building envelope, both interior and exterior. This system anticipates changing room temperature, humidity and comfort levels to better maintain the interior in a predetermined comfort zone. By so doing, the networked structure achieves similar or greater comfort for the occupants at similar or lesser cost of previous systems.

The panels include temperature, humidity, light (especially infrared), and other sensors embedded in the panel's exterior and interior surfaces (FIG. 18) to sense and transmit the environmental data to other devices on the network. Since outside energy conditions have a tremendous impact on interior conditions it is desirable to move the environmental sensing technologies (like a standard thermostat or an IP enabled thermostat) to the exterior of the building envelope and have those sensors communicate with a central unit controlling different zones in a house.

Because thermal flow through the panel takes time, the CMC will know how hot or cold it is outside the wall or inside the wall or at the interior of the wall and then be able to react accordingly as the temperature profiles of the structure itself changes. For example in the northern hemisphere the north side of the structure will almost never see the sun (unless reflected off of something else) and will have a different thermal profile than the south side (most sun), east side (morning sun) or west side (evening sun) walls or roof of the structure. Through this data of the very dynamic nature of the thermal profile of the structure throughout the day and night the CMC more efficiently manages the interior temperature of the structure and thereby save significant money over a period of time compared to the traditional "thermostat" technology.

A traditional thermostat does not know if it is a hot day or a cold day, if the sun is out or if it is cloudy or rainy, merely it tracks the interior temperature long after the conditions outside have affected most of the building's interior, creating additional work for any interior climate control system triggered by this thermostat.

Thus, a distributed sensor network for interior climate control (FIG. 22) monitors different environmental parameters (temperature, humidity, visible light, infrared radiation, etc.) at the outer perimeter of the structure and a central information processor uses the data to anticipate what interior environmental conditions will be in the future and directs a distributed HVAC vent system to more accurately control interior conditions with significantly fewer resources, saving energy, money, etc.

The climate control system opens windows (e.g. cloister windows) to cool (or warm) the house in an energy efficient way. These may also consider variables such as temperature, humidity, wind speed and occupancy to determine whether to open windows.

Panel ID

Each panel has a unique electronic identifier, which is accessible through the network and provides both a network location and a physical location relative to the other panels, and therefore the location of the panel in the structure is determined. In an example embodiment, the unique identifier is an RFID tag. In this manner, the exact location of each panel is known, and therefore any malfunctions or misplacements are quickly located.

For example, some panels have an embedded iBeacon for locating the panel. In addition to being active and compatible with cell phones, the iBeacon is used after installation to know what the capabilities of a particular panel are.

In an alternative embodiment, each panel includes an LED, which is modulated to allow easier physical location of the panel by user.

Panels embedded with an electronic identifier, either RFID or otherwise, are able to detect when they are connected to a correct adjacent panel and signal through the network to an output device. The panels are programmed to detect the identity of an adjacent panel, then signal if the identity matches a stored identity. Each panel contains an RFID and a database of matching panel identifiers. When the RFIDs are activated by the assembler using a reader, they transmit their signals. The signals are received and checked against the database. Alternatively, the central system controller receives the identity of the two panels, and check that their placement is correct. The panels are able signal the correct placement of two panels as they are connected, through the central controller and/or by lighting the two LEDs of the panels, such that the assembler immediately knows if the panel just added is correct. The panels also signal through the network to an output device when all the panels are assembled and connected for a given structure.

The central computer system maintains a database of events for each panel. For example, the database maintains records of the electronic devices plugged into the panel, the records of the sensors plugged into the panel, and the like.

Building Control

The network connectivity is extended across modules for a building control system or across buildings for a building complex control system.

FIGS. 23A-D illustrate a wall panel with embedded sensors for controlling entry. either singularly or in an array to facilitate a positive response (such as entry access) with someone having a key device (smartphone, watch, wristband, vehicle, etc.) triggering the sensors in a code-affirmative actuation.

A remote sensor, or an array of remote sensors contained within one or a multiple of panels is used for access control mechanisms where the "key" device is provided by the person desiring access and access is acquired by a simple remote sensing or a specific pre-determined pattern of sensing (similar to code on a keypad sequence).

Magnetic door locks are also integrated into the panels. These are controllable through the embedded data network (described herein), thereby providing an access control system that is integrated into the panels and ready for activation immediately upon assembly of a structure.

Containerized

In a preferred embodiment, the entire system is packed as a complete kit within a cargo container or standard shipping container as illustrated in FIG. 2. This optimized packaging for using the container facilitates the delivery and storage of multiple containers in a central location until such time as needed for rapid erection of a structure, for example in the case of an unexpected natural disaster. This building kit also preferably includes a complete tool kit to facilitate complete assembly of the structure; the building kit also includes items such as an electric generator, limited fuel for the generator, a renewable power source such as solar panels or wind turbines, water and basic non-perishable foodstuffs, thereby providing for a complete emergency shelter that can be occupied and used immediately upon delivery and installation, without requiring any separate tools, supplies, or equipment to be a fully-functioning facility or shelter. The container also includes cabinets, sinks, toilets, showers and even furniture for installation within the modular building to provide for immediate and also possibly long-term occupancy in the shelter. The cargo container is then used as a secondary structure for storage if left on the site.

Advantageously, the panels of the present invention are the most advanced structurally insulated building panel on the market today. Except for corner panels, all flat panels are provided so that they will stack tighter. In some configurations corner panels can efficiently be used to "wrap" the flat panels. The present invention provides a modular building system for creating an energy-efficient structure including: a multiplicity of pre-fabricated panel wall components and roof components, each having a face side and a back side and four edges including a pair of spaced-apart parallel tracks that run the length of at least two opposite edges for aligning the edges together to form a seam, wherein the components further include locking components for securely attaching the components together along the seams.

Also, methods for providing a modular building structure including the steps of: providing a containerized kit wherein the kit is sized and configured to be enclosed by a housing and includes therewithin a modular building system further comprising a predetermined number of modular wall components, a roof system, and at least one door; providing instructions for assembling the modular building system for forming a complete building unit, including aligning the modular wall components along their opposite edges via a mating profile that extends along the length of the wall to provide an energy efficient seam when wall components are joined.

One application for the present invention includes a structure or building for a command or support center after an emergency to be erected on a flat surface. Other applications include but are not limited to medical center, school or residential structures.

In preferred embodiments of the kits for modular buildings, preferably included with the modular panel components for assembling to form a basic structure are the following:

Panels in a pre-configured kit including ventilation technology, window panels, door panels, two segment and multi-segment corner panels, beam pocket panels and window(s) pre-set into at least one panel; at least one door frame is fitted to allow final site placement quickly and easily; alternatively, the door is pre-installed. The panels have at least some finishing on the face side that would be externally or outwardly facing upon assembly and installation for the building structure, by way of example and not limitation the face side finish includes a pre-finished exterior siding such as commercially offered by Hardi Panel or LP SmartSide; a plurality of structural members for supporting roof structure including a modular box beam with joints secured by pins; at least one composite sill plate and secondary base plate with flashing for foundation; tools required for structure assembly including panel cam-locks, sealant foam, foam applicators, etc.; instructions, plans, and figures illustrating assembly in at least one language or even multiple language(s) as required, preferably including figures showing step-wise assembly and installation, as well as an indication or listing of all the parts and components within the kit and how they relate to each other; rigid flashing for the top roof ridge (at the junction of the two different panel slopes), roof lining material, finished roofing material, modular electrical baseboard outlet kit; communications system or equipment (such as by way of example and not limitation, a communication system for satellite-based telecommunication of voice and/or data); scaffolding if wall panels were greater than about 8 ft. in height; Universal Power Supplies & filter (UPS) for sensitive electronic equipment; solar panels (PV or solar-thermal) for attachment or integration with select panels, preferably roof panels; FRP laminated panel interior (like for medical or school application); at least one bathroom module including sink and toilet, and preferably a shower unit.

Additionally, it is preferred to have equipment and/or appliances included with the kit to provide a fully functioning building structure with energy, heat and/or cooling, testing equipment, refrigeration, cleaning equipment, portable beds and/or bedding (in particular in the case of a medical structure application), at least one generator with fuel storage tanks safe for long term storage (LP, LNG, etc.), a potable water supply or container therefor (such as for about 250 gal of water), meals ready to eat (MRE) wherein the quantity depends upon user specification, cooking equipment, such as portable camping-type ovens; matches or other flame source, a ladder, solar oven or solar-powered cooking or heating equipment; water purification system for point-of-use water treatment; water collection system (including but not limited to rain collection), portable battery-powered and/or rechargeable lighting, computers and electronic equipment, etc.

Other optional supplemental items for inclusion in the kit include the following: basic modular furniture (tables, chairs, filing cabinets, locked storage cabinets, etc.), First Aid Kits; portable transportation for personal use, such as all-terrain vehicles, motorized or manual, or bicycles (mountain bikes); surveillance equipment.

Optional Extras further include: additional consumable supplies, including but not limited to food, water, medical supplies, batteries, water filters or point-of-use purification equipment; medication or first aid supplies; bedding and clothing; protective gear specific to predetermined location, by way of example and not limitation, gas masks, impermeable gloves, hat, clothing, to protect from contamination or toxic agents; rope, chainsaws, other tools.

Also, supplemental or specific power supply alternatives is provided, including by way of example and not limitation, a wind power generator, water power generator, solar power generating equipment, power inverters if required, etc. These alternative power supplies provide DC power to the various accessories, such as wireless repeaters, video cameras, microphones, etc.

One application of the kits for modular buildings according to the present invention is to provide emergency shelter kits that would be deliverable to a site or location in advance of or following an emergency situation, such as weather catastrophe, illness outbreak, or is provided in advance of construction of larger buildings. While the present invention modular buildings formed from the kits an components described herein are suitable for long-term use, they are also used for temporary buildings or for limited time specific use buildings. As such, the containers housing the kits for modular buildings preferably are rated and/or have a "storage life" where some items like tool batteries, MREs, water, and other items having some predetermined shelf life, would have to be replenished after a predetermined time, by way of example about 5 years. Replenishment kits are included within the kit or separately and independently ordered periodically based on the number of containers originally ordered and not yet used.

The panels are arranged in a variety of configurations to create a structure, and the present invention provides for rules-based panel design methods and software, that allowed panels to be arranged in any configuration the user desired. The panels are purchased on-line through a menu that allows the manufacturer real-time access at demand to make more efficient the manufacturing process. The user is not necessarily ordering a home, he is merely ordering a kit of panels. Further the user would be able to design custom panels. The manufacturer could have many factory locations manufacturing the standard panels and just a few factories manufacturing the custom panels so that the user is able to achieve the design they want and the manufacturer is able to achieve the volume efficiencies that they need.

The present invention further provides for a scale model or "toy" of the full-size invention. The scale model is used to design and display different structures using miniature panels and other components. For example, architectural firms use the scale model to offer clients a realistic model of a planned home. The model kit is also used to teach or entertain students and children. The scale model kit includes scale-model panels and other associated parts, such as LED lights and fans, and solar panels to power the various appliances in the model.

Further, the manufacturer of these structures could partner with other product manufacturers to market associated or complimentary items in the same panel product offering, including items like, but not limited to: LED lighting solutions, windows, energy recovery ventilators, HVAC or mini-split systems, cabinets or countertops, siding or roofing materials, etc.

The panels employ structural siding materials that are complementary technologies (FIG. 25) in building envelope construction such as a flame-resistant coating such as that found on structural grade sheathing in Louisiana Pacific's FlameBlock fire-rated OSB sheathing to provide fire resistance to the building panel.

Vertically oriented straps of varying width but of sufficient tensile strength are integrated into the assembly of the prefabricated panel (FIGS. 26A,B) between the skin of the panel and the insulation so as to allow additional retention strength for the entirely assembled structure. Straps of this type may be known as "hurricane straps or ties" or similar offered by Simpson Strong-Tie or other such companies, or they are carbon fiber, Kevlar or other synthetic or composite type straps whose increased strength in tension compliments the strength of the panel itself and aids in improving the overall strength of the structure.

Cam-Lock Bracket System

Figure 28A:
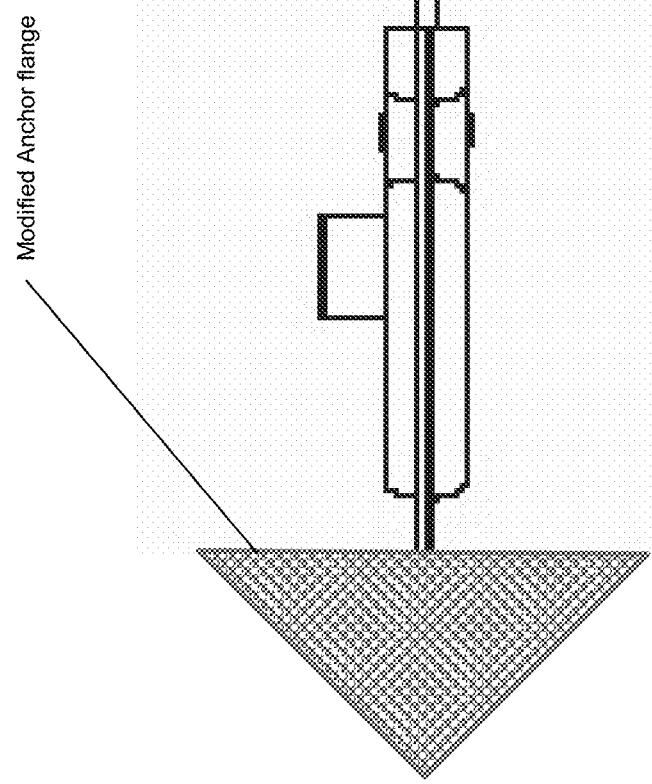
FIGS. 28A&B illustrate an anchor flange according to the present invention.
Figure 28B:
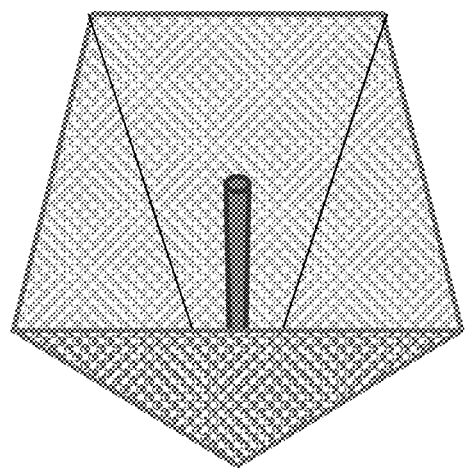
FIG. 28B is perspective view of the anchor flange.
Figures 30A, 30B:
FIGS. 30A&B illustrate a camlock access shaft insert according to the present invention.
FIG. 30B is an end view of the cam-lock access shaft.
Figure 31:
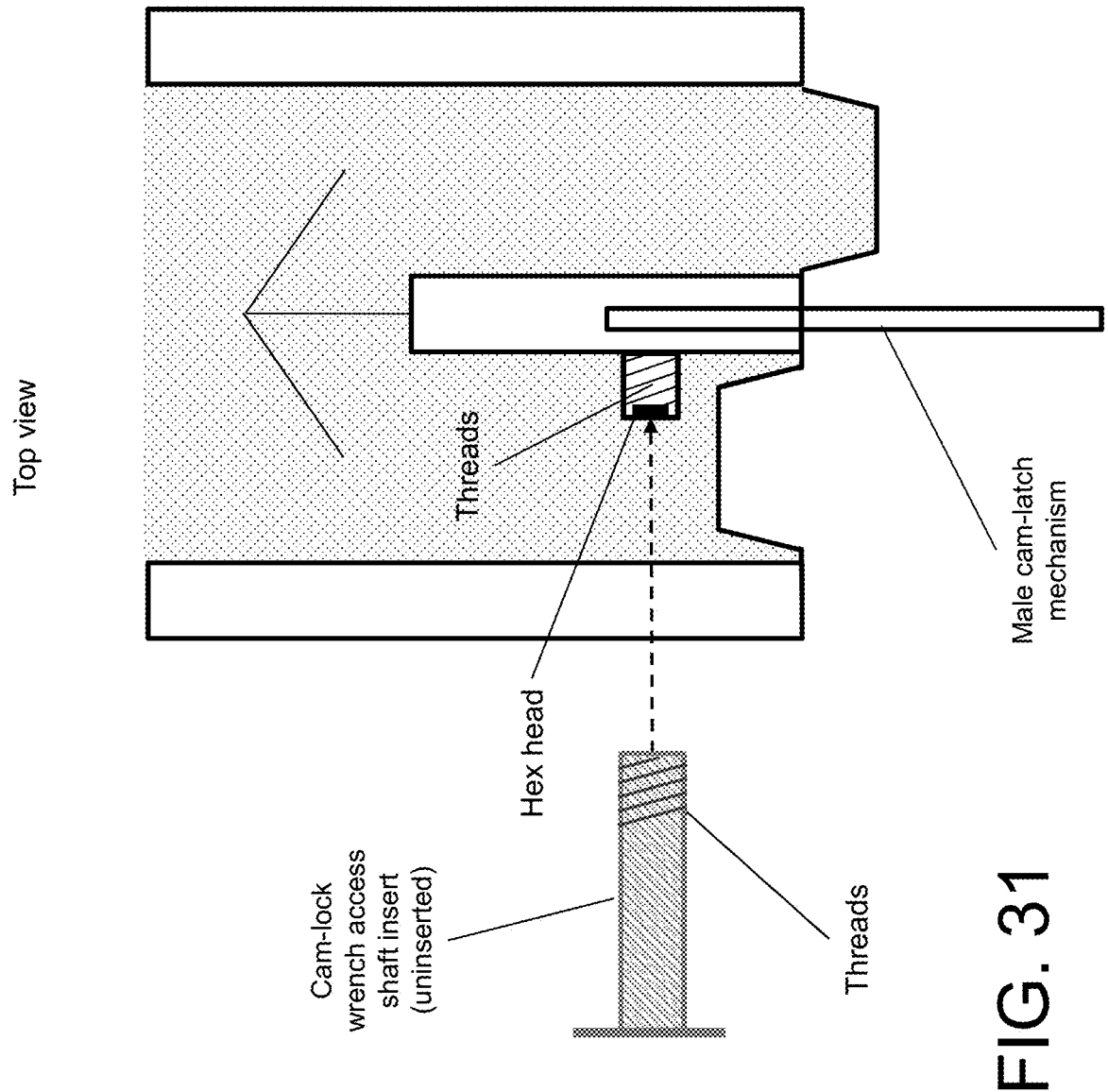
FIG. 31 illustrates an unassembled view of the cam-lock access shaft insert of FIGS. 30A&B prior to assembly with a cam-lock.
Figure 32:
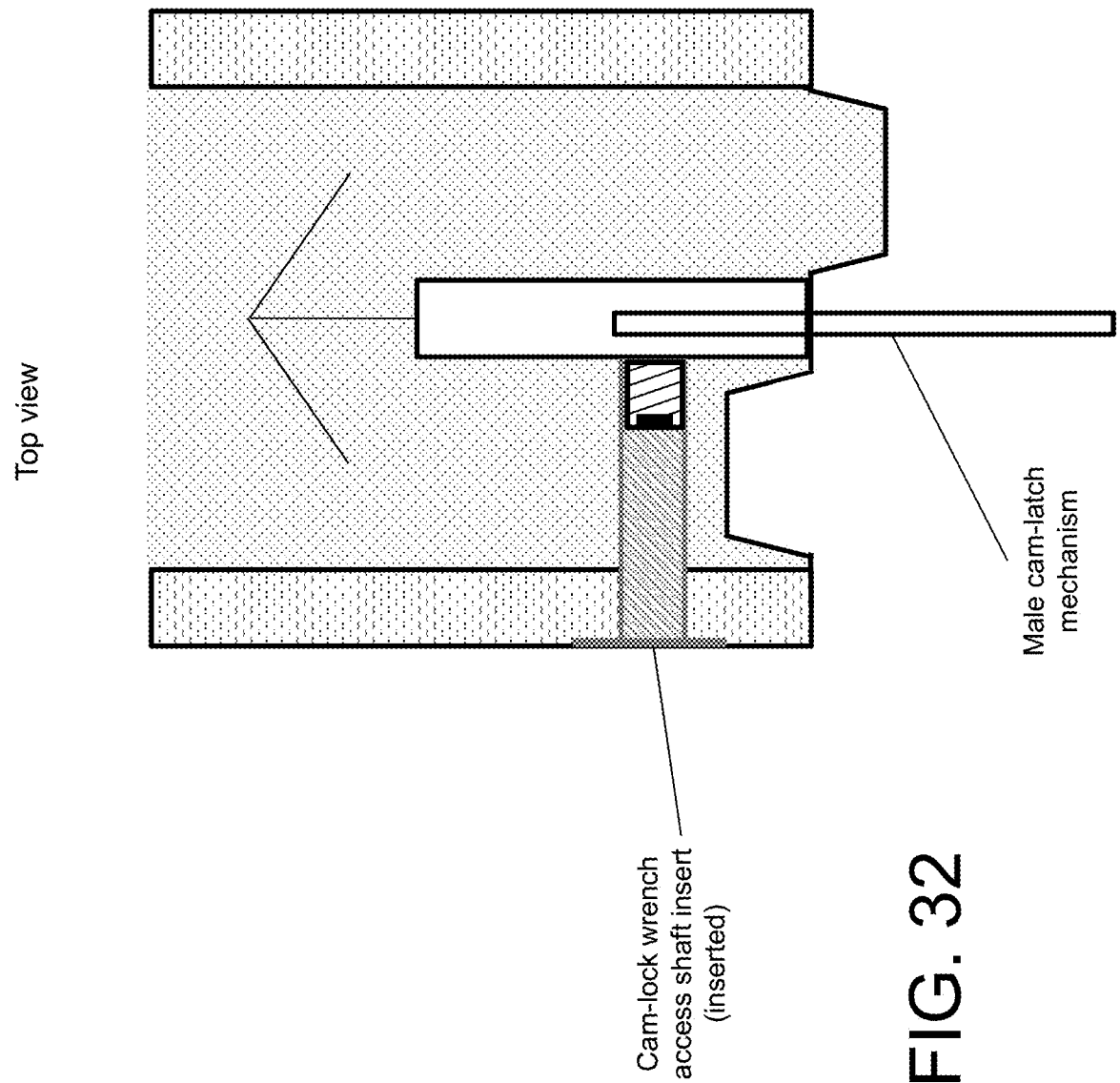
FIG. 32 illustrates an assembled view of the cam-lock access shaft insert of FIGS. 30A&B after assembly with a cam-lock.
Figure 35A:
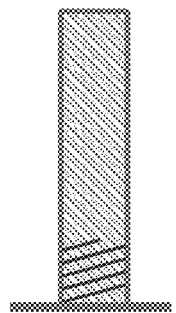
FIGS. 35A&B illustrates another cam-lock access shaft according to the present invention.
Figure 35B:
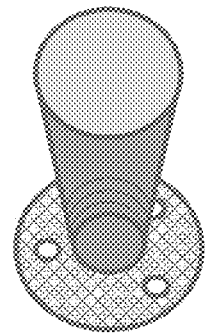
FIG. 35B is an end view of the cam-lock access shaft.
Figure 36:
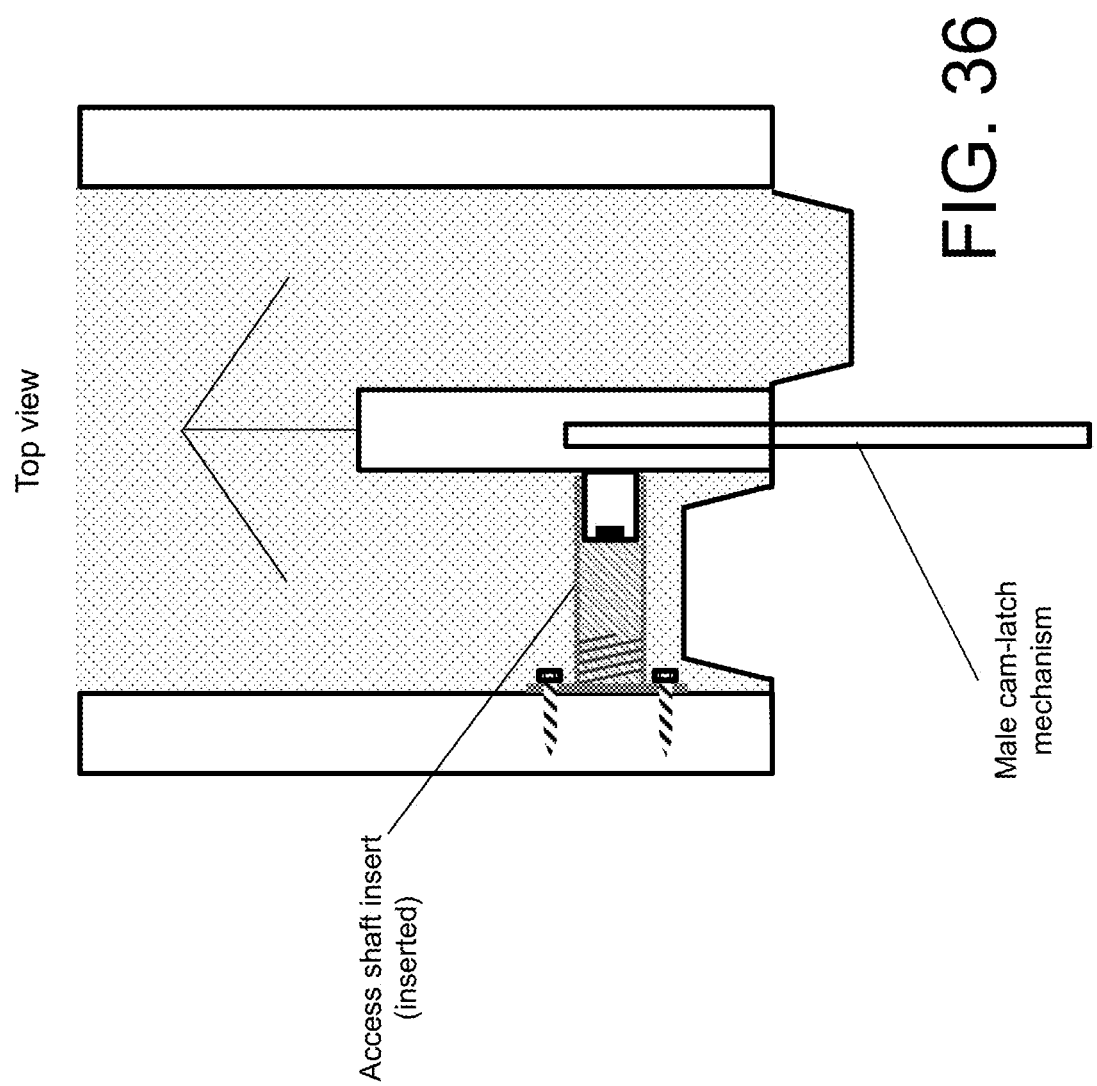
FIG. 36 illustrates an assembled view of the cam-lock access shaft insert of FIGS. 35A&B after assembly with a cam-lock.
Figure 37:
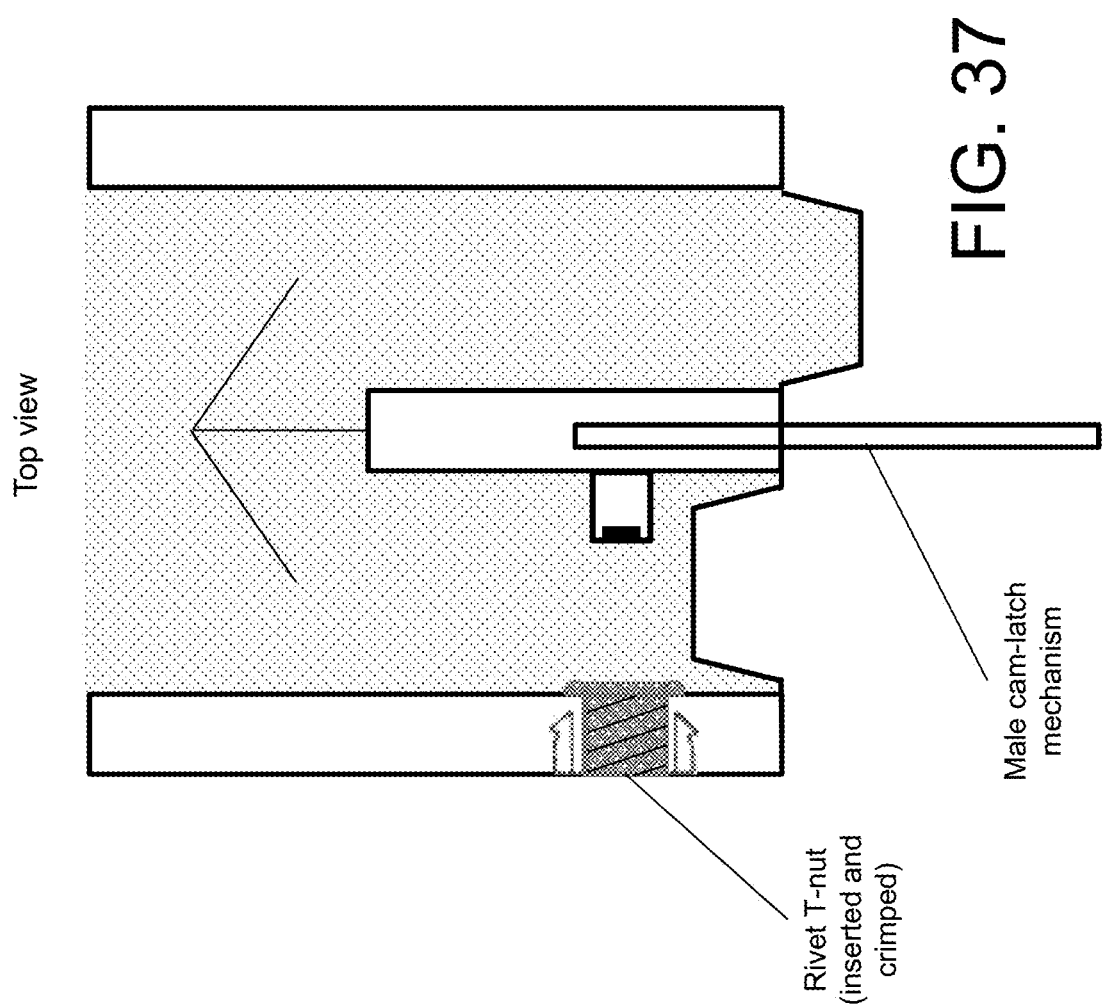
FIG. 37 illustrates the rivet T-nut of FIGS. 34A-C assembled in a cam-lock according to the present invention.

The present-invention uses cam-locks, which are well-known in the prior art. An exemplary prior art cam-lock system is shown in FIGS. 27A-D. The prior art cam-lock system includes a locking point (male) and a strike (female). An anchor flange is embedded in the foam core for securing the locking point and the strike in the foam core. The prior art anchor flange is in the form of a vee. The prior art cam-lock is designed and configured for operation by a hex key wrench or similar. The cam has a hex head incorporated into it and the hex key wrench is inserted into the hex head to turn the lock. Some prior art cam-locks include an access shaft that extends to the surface of the panel. The access shaft prevents insulation from entering the hex head and interfering with the operation of the cam-lock In the present invention, the anchor flange is designed and configured to ensure that the cam-lock cannot be torn from the panel when under a specified load. The anchor flange is a pyramidal shape to add more structural strength to the anchor flange (FIGS. 28A and 28B). Preferably the flange is perforated to allow air to escape during manufacturing.

Additionally or alternatively, opposing cam-lock components can be connected by a high-tensile device, such as a high-tensile steel cables or zip-ties to provide more load resistance. In an example embodiment, a high-tensile cable is looped through the cam-lock components and tensioned with a turnbuckle (FIG. 29A). In another example, multiple cam-lock components are connected by a single cable (FIG. 29B). By weaving the cable diagonally between cam-lock components, the cable forms triangular structures which provide additional bracing, especially bracing against shear forces or blast forces, to the panel and the overall structure. When the high tensile steel cable is combined with reinforced strength cam-locks the structure effectively becomes "wrapped" entirely by high tensile strength steel (or similar carbon fiber, etc.) to further strengthen a structure.

In the present invention, a cam-lock wrench access shaft insert is provided to extend the access shaft past the surface of the panel. Generally, the access shaft insert is a cylinder designed to receive a support rod, which is described later. Preferably, the access shaft insert is flush with or recessed in the exterior surface of the panel, such that the panels slide across one another during stacking and unstacking.

As shown in FIGS. 30-40, the access shaft insert can be of different designs and configurations. In one example embodiment (FIGS. 30-32), the shaft insert is threaded and threads over the cam-lock hex head, which is matingly threaded on its exterior. In another example embodiment (FIGS. 33, 35, 36), the access shaft insert is a T-nut that inserts into the panel but only slides over the hex head. In this embodiment, the T-nut does not thread onto the hex head.

In another embodiment, the T-nut is a rivet T-nut (FIGS. 34A-C, 37). The rivet T-nut provides a sturdy insert into which a support rod can be threaded. The rivet T-nut is installed on the panel skin prior to manufacture of the pane.

The access shaft insert is furthermore designed and configured to receive brackets, as shown in FIGS. 38-40.

The cam-lock shaft bracket includes a structurally reinforcing shaft that inserts into the access shaft insert. In one embodiment, the reinforcing shaft is threaded on the exterior and thus screws into a matingly threaded access shaft insert (FIGS. 38 and 39). Additionally or alternatively, the reinforcing shaft slides over the cam-lock hex head (FIG. 40) to provide more support and prevent rotation of the bracket when weight is applied to the bracket.

Thus, some embodiment of the cam-lock components, both the locking point and/or the strike, include an attachment point for reinforcement of the access shaft insert or the reinforcing shaft.

The brackets are inserted into the cam-locks, then structures such as furniture, beds, shelves, coat/equipment racks and the like are secured to the brackets (FIGS. 41A-C). Thus, the bracket types include a shelf bracket, a coat rack, a bed support, a desk support, a bench support, a chair support, cabinets, equipment hangers and even reinforcing structural components. The cam-locks are also used to secure additional structural bracing to add to the overall strength of the structure. The cam-lock access hole is thus designed, configured, and reinforced to support pegs or brackets and the weight they support.

In another embodiment, the cam system uses shape metals, such as nitinol. The shape of the metal is changed through a number of means, including technical, temperature, and electrical.

Up-Armored Buildings

Figure 43:
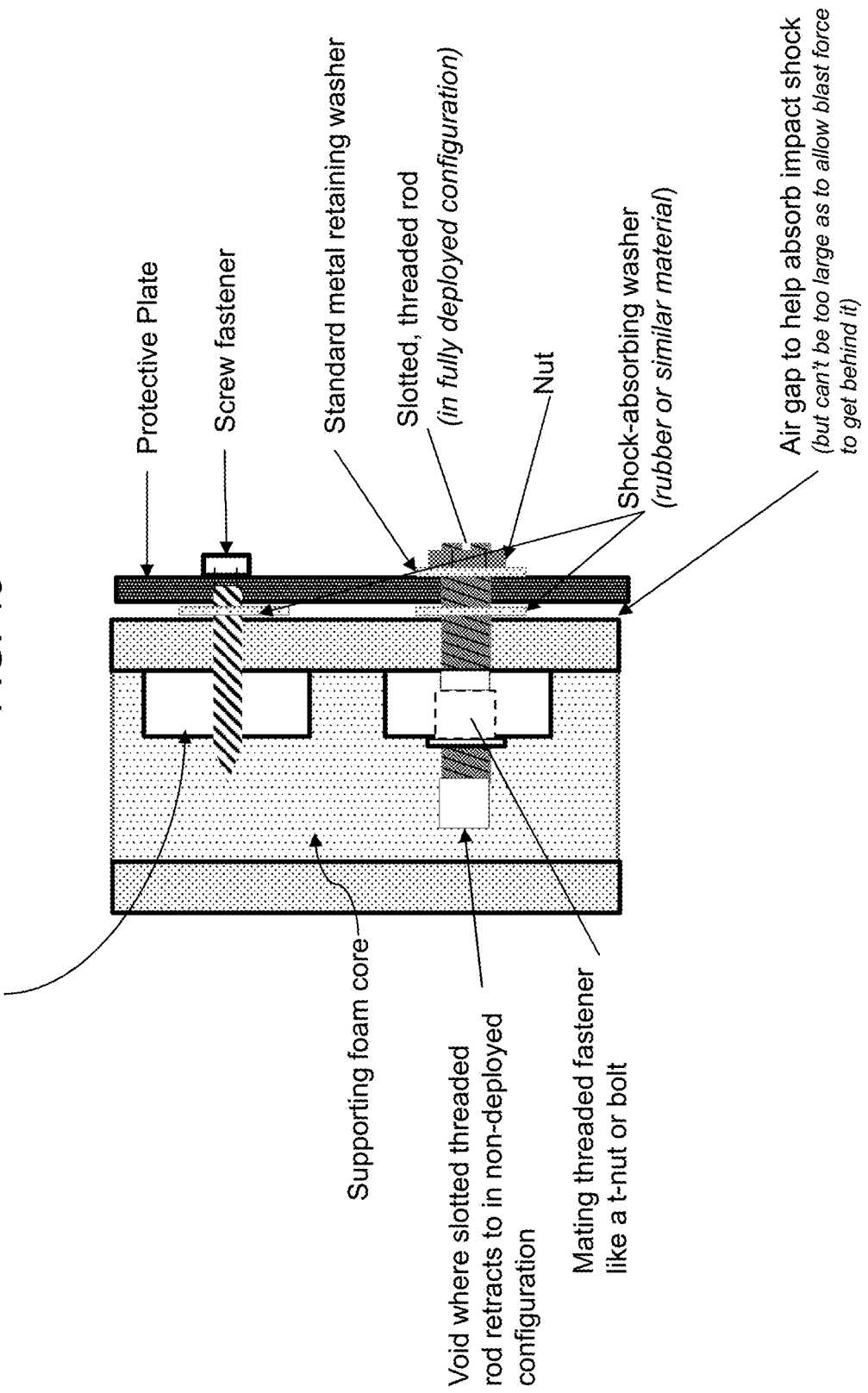
FIG. 43 is a sectional view illustrating two mechanisms for fastening protective plates to a panel for up-armoring a building according to the present invention.

The present invention provides for up-armoring buildings. As shown in FIGS. 42-44, supporting structures are embedded inside the panels to support armor affixed to the exterior of a panel. FIGS. 42A-C illustrate embedded structural members inside of insulated building panels in different locations and orientations as part of the system for system for up-armoring a building. The structural members are embedded vertically, horizontally, or diagonally. The structural members are supported by the foam core, making them structurally stronger than if not in the foam. In one embodiment, the foam core includes polyurethane. The foam core does not include polystyrene. The insulation does not include formaldehyde. The panels have an R value between 26 and 40.

As shown in FIG. 43, fasteners such as washers, screws, bolts, nails, all-thread with nut and the like are used to affix protective plates to a panel by fastening them to an embedded structural member. FIG. 43 shows a lag screw and an all-thread slotted bolt being used as fasteners. The advantage of an all-thread slotted bolt is that it can be mounted recessed into the panel when not in use, and thus not hinder the stacking of panels and not snag or injure passersby. The all-thread slotted bolt is shown in FIG. 43 in use with a mating threaded fastener affixed to the embedded structural member.

FIGS. 44A-C are views of a wall without the panel skin showing the insulated structural panels with embedded structural members. FIG. 44D shows a wall with armor attached. The armor can be metal, ballistic cloth, ceramic armor and the like. Furthermore, combinations of armor types can be used. For example, ballistic cloth can be used to form pouches that support metal or ceramic armor.

Prior art cam-locks generally fail at the strike pin, which generally can support about 400 lbs. of load. In the present invention, the strike pin is rated to about 5,000 lbs. of load to withstand explosions and projectiles.

Personal Assistant

The present invention further provides for a voice-controlled personal assistant composed of microphones plugged into the data access ports throughout the structure in communication with a central computer system, the central computer system analyzing speech captured through the microphones and taking appropriate action based on the analysis.

Central Computer System

Figure 46:
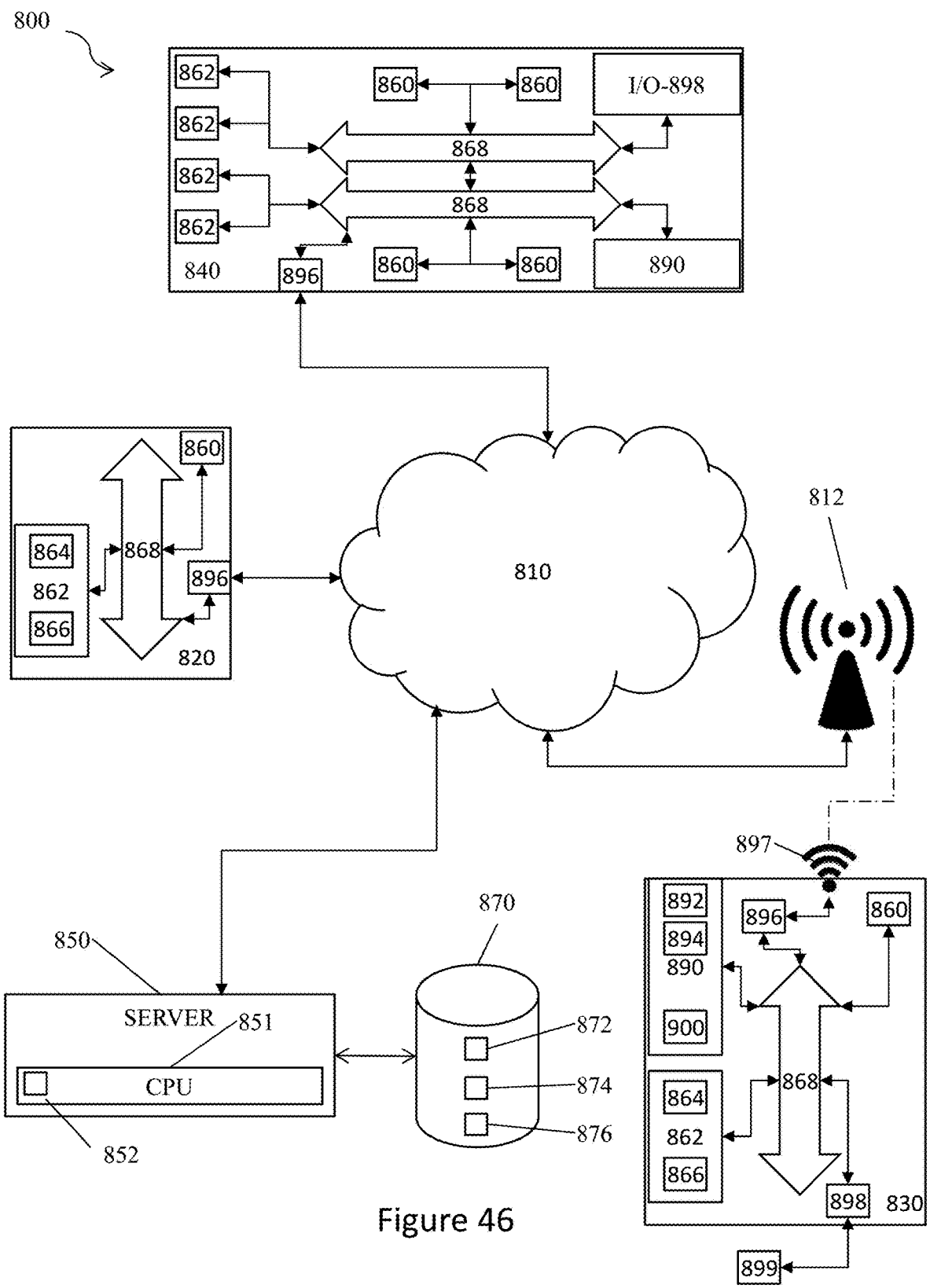
FIG. 46 is a schematic diagram of a system of the present invention.

FIG. 46 is a schematic diagram of an embodiment of the invention illustrating a central computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by at least one mobile communication computing device 830. In another embodiment of the invention, the system 800 is a virtualized computing system capable of executing any or all aspects of software and/or application components presented herein on the computing devices 820, 830, 840. In certain aspects, the central computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 46, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the central computer system 800 may operate in a networked environment using logical connections to local and/or remote computing devices 820, 830, 840, 850 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed central computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the central computer system 800.

It is also contemplated that the central computer system 800 may not include all of the components shown in FIG. 46, may include other components that are not explicitly shown in FIG. 46, or may utilize an architecture completely different than that shown in FIG. 46. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A modular building panel comprising:
a front side, a back side, at least 3 edges, an interior foam insulator, and embedded electrical supply components;
wherein the electrical supply components include an electrical conduit or a chase and at least one embedded technology module;
wherein the at least one embedded technology module includes a modular device holder;
wherein the at least one embedded technology module is configured to receive at least one pluggable device;
wherein the at least one embedded technology module includes at least one data communication line and at least one data access point in electronic communication and partially surrounded by the interior foam insulator, wherein the at least one data access point includes a wireless router;
wherein the at least one pluggable device includes at least one electrical device, at least one radiant heating device, at least one micro-electromechanical systems (MEMS) device, at least one electronic networking device, at least one sensor, at least one recorder, or at least one light-based communication device;
wherein the at least one electronic networking device is configured for network connectivity; wherein the at least one electronic networking device includes at least one wireless transceiver, wherein the at least one wireless transceiver includes a mesh network transceiver;
wherein the at least one embedded technology module is hot pluggable; and
wherein the electrical supply components are connected to permit electrical wiring and are at least partially surrounded by the interior foam insulator.

2. The panel of claim 1, wherein the electrical conduit or the chase is completely surrounded by the interior foam insulator and the at least one embedded technology module is partially surrounded by the interior foam insulator and has a surface exposed to the exterior.

3. The panel of claim 1, wherein the electrical supply components include at least one AC/DC converter or inverter.

4. The panel of claim 1, wherein the at least one sensor includes a temperature sensor, a humidity sensor, a smoke/fire sensor, an air quality sensor, a gas sensor, a sound sensor, an ion mobility spectrometry (IMS) sensor, or a motion sensor.

5. The panel of claim 4, further including an embedded automatic lock device in communication with a central computer system.

6. The panel of claim 5, wherein the panel is a physical access point; wherein the central computer system is configured to unlock the automatic lock device; wherein the at least one sensor is configured to detect an emergency; wherein the at least one sensor is configured to notify the central computer system about the emergency; wherein the central computer system is configured to unlock the automatic lock device upon receiving the notification of an emergency.

7. The panel of claim 1, wherein a height of the at least one pluggable device is less than the height of the at least one embedded technology module such that the at least one pluggable device is operable to fit in the at least one embedded technology module.

8. The panel of claim 1, wherein the interior foam insulator includes polyurethane.

9. The panel of claim 1, further comprising the at least one sensor, wherein the at least one sensor is operable to be connected to the at least one pluggable device, wherein the at least one sensor is embedded in the front side or the back side of the panel.

10. The panel of claim 1, wherein the at least one embedded technology module is operable to receive a standard electrical socket, a networking interface, a sensor array, and a USB charger.

11. The panel of claim 1 further including a modular seamless corner component, wherein the modular seamless corner component is shaped to provide a corner for a rectangular structure.

12. The panel of claim 1, wherein an R value of the panel is between 26 and 40.

13. The panel of claim 1 further including a double railing component configured to mate with a mating double railing component of another panel, wherein the double railing component includes a pair of spaced-apart parallel tracks.

14. A modular building, comprising:
a central computer system;
at least one modular building panel comprising:
a front side, a back side, at least 3 edges, an interior foam insulator, and embedded electronic components; and
wherein the embedded electronic components are at least partially surrounded by the interior foam insulator;
wherein the embedded electronic components include at least one embedded technology module;
wherein the at least one embedded technology module includes a modular device holder;
wherein the at least one embedded technology module includes at least one data communication line and at least one data access point in electronic communication and partially surrounded by the interior foam insulator, wherein the at least one data access point includes a wireless router;
wherein the at least one embedded technology module is configured to receive at least one pluggable device;
wherein the at least one pluggable device includes at least one electrical device, at least one radiant heating device, at least one micro-electromechanical systems (MEMS) device, at least one electronic networking device, at least one sensor, at least one recorder, or at least one light-based communication device;
wherein the at least one electronic networking device is configured for network connectivity; wherein the at least one electronic networking device includes at least one wireless transceiver, wherein the at least one wireless transceiver includes a mesh network transceiver;
wherein the embedded technology module is hot pluggable; and
wherein the central computer system is in communication with embedded technology module.

15. A modular building panel comprising:
a front side, a back side, at least 3 edges, an interior foam insulator, and embedded electrical supply components;
wherein the front side includes a video camera, wherein the video camera is mounted on the front side;
wherein the back side includes an electronic web-enabled video monitor, wherein the electronic web-enabled video monitor is mounted on the back side, wherein the electronic web-enabled video monitor is configured for electronic communication with the video camera;
wherein the electrical supply components include an electrical conduit or a chase and at least one embedded technology module;
wherein the at least one embedded technology module includes a modular device holder;
wherein the at least one embedded technology module is configured to receive at least one pluggable device;
wherein the at least one pluggable device includes at least one electrical device, at least one radiant heating device, at least one micro-electromechanical systems (MEMS) device, at least one electronic networking device, at least one sensor, at least one recorder, or at least one light-based communication device;
wherein the at least one sensor includes a temperature sensor, a humidity sensor, a smoke/fire sensor, an air quality sensor, a gas sensor, a sound sensor, an ion mobility spectrometry (IMS) sensor, or a motion sensor;
wherein the at least one electronic networking device is configured for network connectivity; wherein the at least one electronic networking device includes at least one wireless transceiver, wherein the at least one wireless transceiver includes a mesh network transceiver;
wherein the at least one embedded technology module is hot pluggable; and
wherein the electrical supply components are connected to permit electrical wiring and are at least partially surrounded by the interior foam insulator.

16. The panel of claim 15, wherein the electrical conduit or the chase is completely surrounded by the interior foam insulator and the at least one embedded technology module is partially surrounded by the interior foam insulator and has a surface exposed to the exterior.

17. The panel of claim 15 further including a modular seamless corner component, wherein the modular seamless corner component is shaped to provide a corner for a rectangular structure.

18. The panel of claim 15 further including a double railing component configured to mate with a mating double railing component of another panel, wherein the double railing component includes a pair of spaced-apart parallel tracks.

19. The panel of claim 15, wherein the at least one embedded technology module is operable to receive a standard electrical socket, a networking interface, a sensor array, and a USB charger.

20. The panel of claim 15, further including an embedded automatic lock device in communication with a central computer system.

* * * * *